US012139938B2

(12) United States Patent
Müller

(10) Patent No.: US 12,139,938 B2
(45) Date of Patent: *Nov. 12, 2024

(54) PULL-OUT LOCKING DEVICE FOR DRAWERS

(71) Applicant: FULTERER AG & CO KG, Lustenau (AT)

(72) Inventor: Wolfgang Müller, Lustenau (AT)

(73) Assignee: FULTERER AG & CO KG, Lustenau (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/015,347

(22) PCT Filed: Jul. 6, 2021

(86) PCT No.: PCT/EP2021/068593

§ 371 (c)(1),
(2) Date: Jan. 10, 2023

(87) PCT Pub. No.: WO2022/013000

PCT Pub. Date: Jan. 20, 2022

(65) Prior Publication Data

US 2023/0279699 A1 Sep. 7, 2023

(30) Foreign Application Priority Data

Jul. 15, 2020 (AT) .................................. A 157/2020

(51) Int. Cl.
*E05B 65/466* (2017.01)
*E05B 65/462* (2017.01)
*E05B 65/464* (2017.01)

(52) U.S. Cl.
CPC .......... *E05B 65/466* (2013.01); *E05B 65/462* (2013.01); *E05B 65/464* (2013.01)

(58) Field of Classification Search
CPC .... E05B 65/462; E05B 65/463; E05B 65/464; E05B 65/465; E05B 65/466; A47B 88/50; A47B 2097/008
See application file for complete search history.

(56) References Cited

U.S. PATENT DOCUMENTS 7,063,398 B2 * 6/2006 Hoffman .............. E05B 65/466 312/215
7,293,845 B2 * 11/2007 Hoffman .............. E05B 65/466 312/219
(Continued)

FOREIGN PATENT DOCUMENTS

DE 202004001998 U1 * 6/2004 ............ A47B 88/57
DE 202007017466 U1 * 4/2008 ........... E05B 65/466
(Continued)

OTHER PUBLICATIONS

Translation EP1500763A2, 17 pages (Year: 2005).*
(Continued)

*Primary Examiner* — Andrew Roersma
(74) *Attorney, Agent, or Firm* — Dickinson Wright PLLC

(57) ABSTRACT

A pull-out locking device for drawers is provided. The device comprises bolt units associated with one of the pull-out guides, each of which bolt units comprises a bolt part that is mounted so as to be movable between a passive position and an actuation position, wherein the bolt parts interact with a cable-like element or with a push element. When the device is locked, a pull-out rail can be pulled out over a remaining portion, with a retaining spring being deformed. When the device is locked, a locking portion is at least at the end of the remaining portion in a locked position and rests against a locking surface that is moved together with the pull-out rail. When the device is released, the locking portion is at least at the end of the remaining portion in a released position.

12 Claims, 13 Drawing Sheets

(56) References Cited

U.S. PATENT DOCUMENTS

| | | | | |
|---|---|---|---|---|
| 7,484,817 | B2 * | 2/2009 | Hoffman | E05B 65/466 312/219 |
| 7,850,259 | B2 * | 12/2010 | Chen | E05B 65/466 312/221 |
| 2004/0100166 | A1 | 5/2004 | Hoffman | |
| 2007/0182292 | A1 * | 8/2007 | Huang | E05B 65/464 312/221 |
| 2008/0061663 | A1 * | 3/2008 | Wu | E05B 65/463 312/333 |
| 2011/0176755 | A1 * | 7/2011 | Chen | E05B 65/466 384/21 |
| 2023/0349197 | A1 * | 11/2023 | Müller | A47B 88/49 |

FOREIGN PATENT DOCUMENTS

| | | | | |
|---|---|---|---|---|
| EP | 1500763 | A2 | 1/2005 | |
| EP | 2354393 | A1 * | 8/2011 | A47B 88/463 |
| WO | 2011146952 | A1 | 12/2011 | |

OTHER PUBLICATIONS

Translation WO2011146952A1, 18 pages (Year: 2011).*

International Search Report and Written Opinion with English translation mailed Oct. 15, 2021 for International Application No. PCT/EP2021/068593, 13 pages.

* cited by examiner

Fig. 2
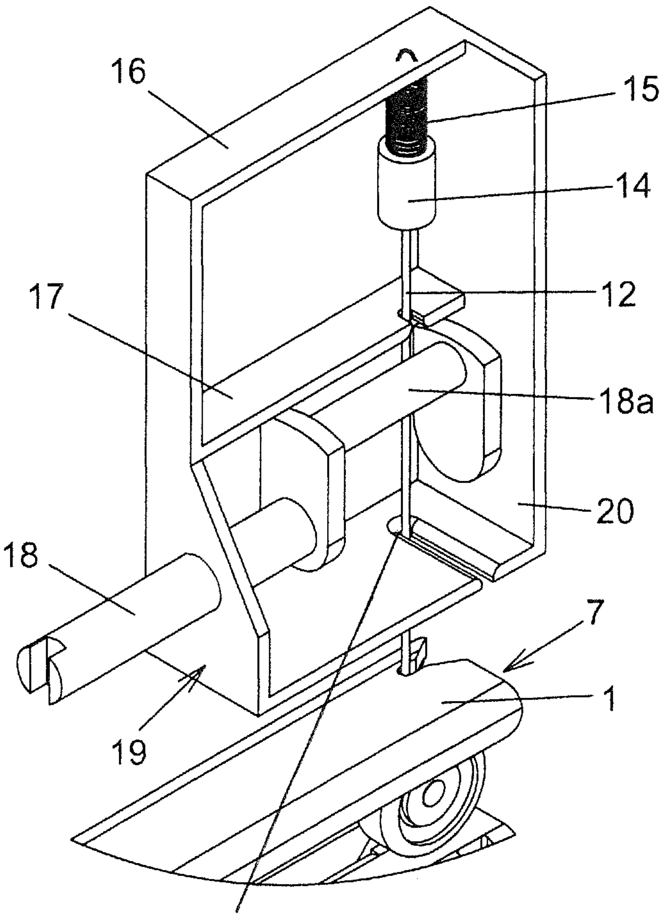
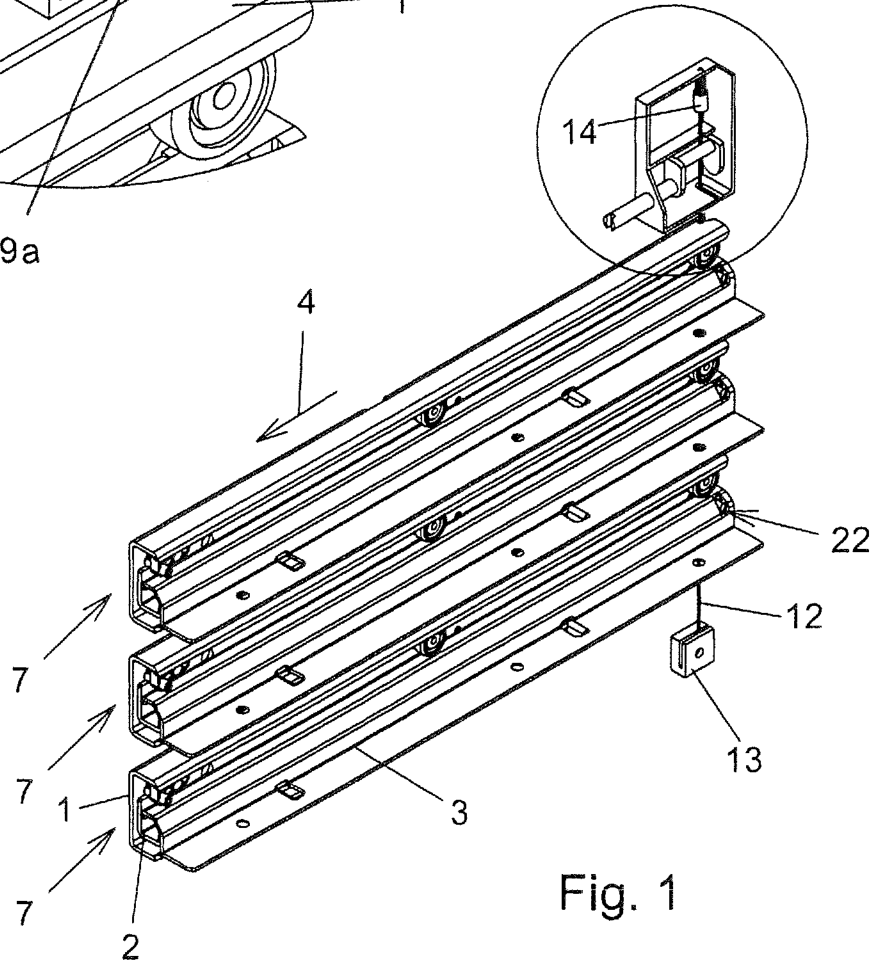
Fig. 1

Fig. 4
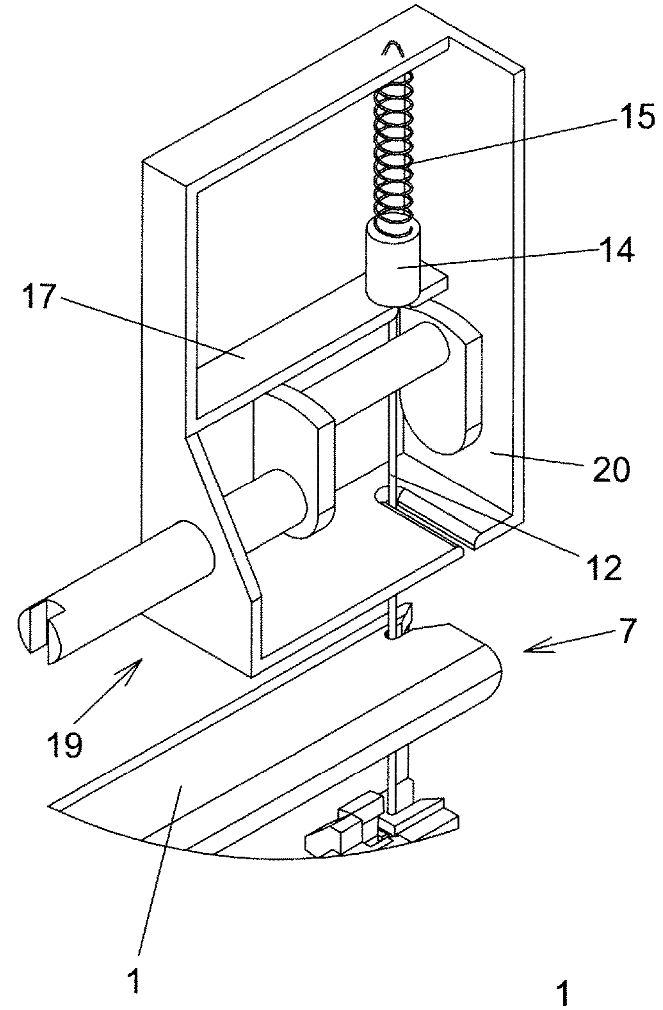
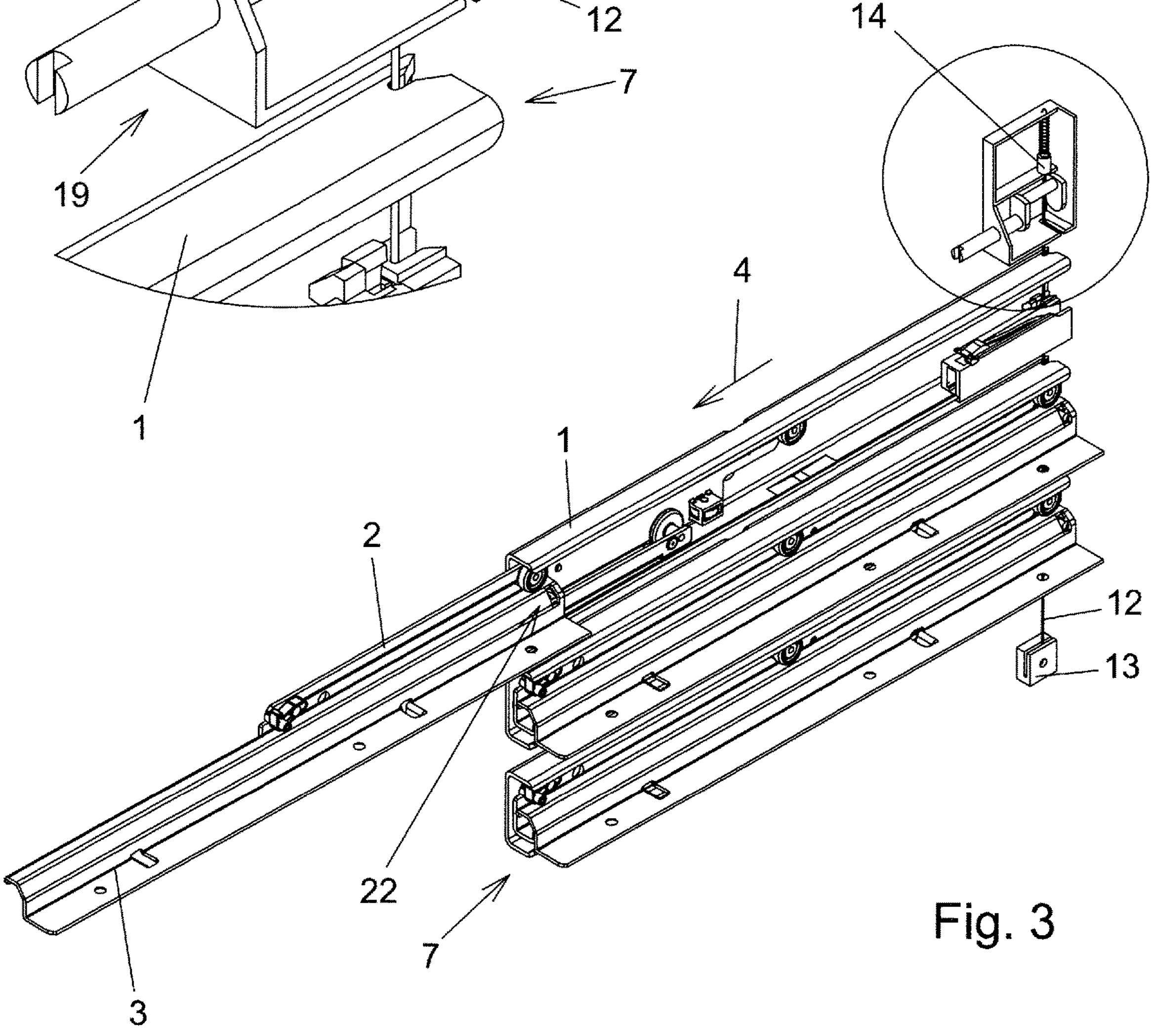
Fig. 3

Fig. 6
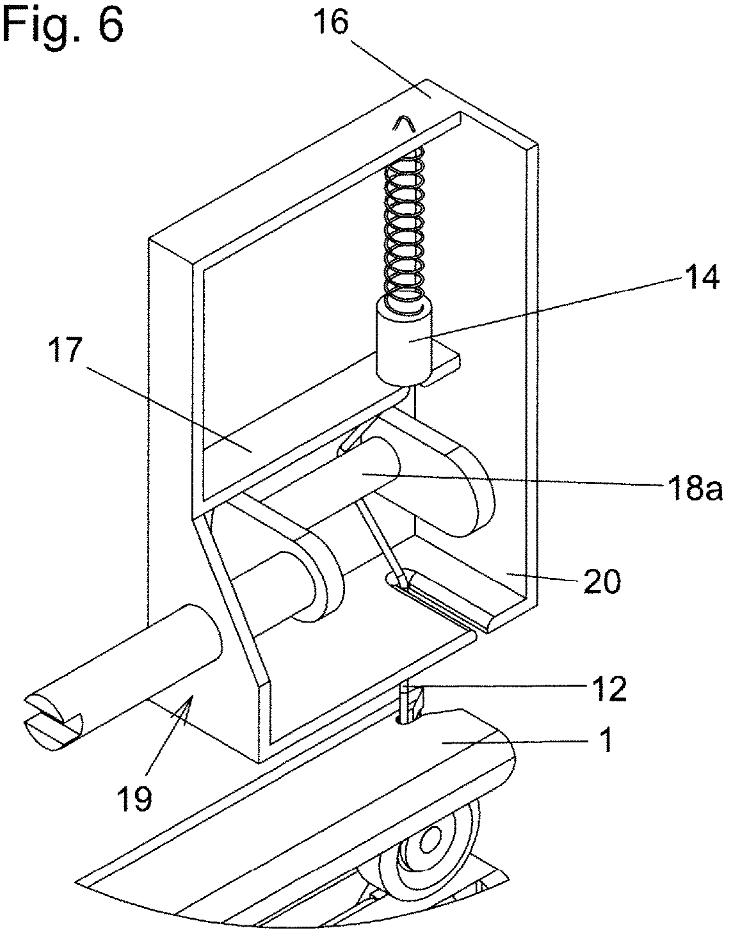
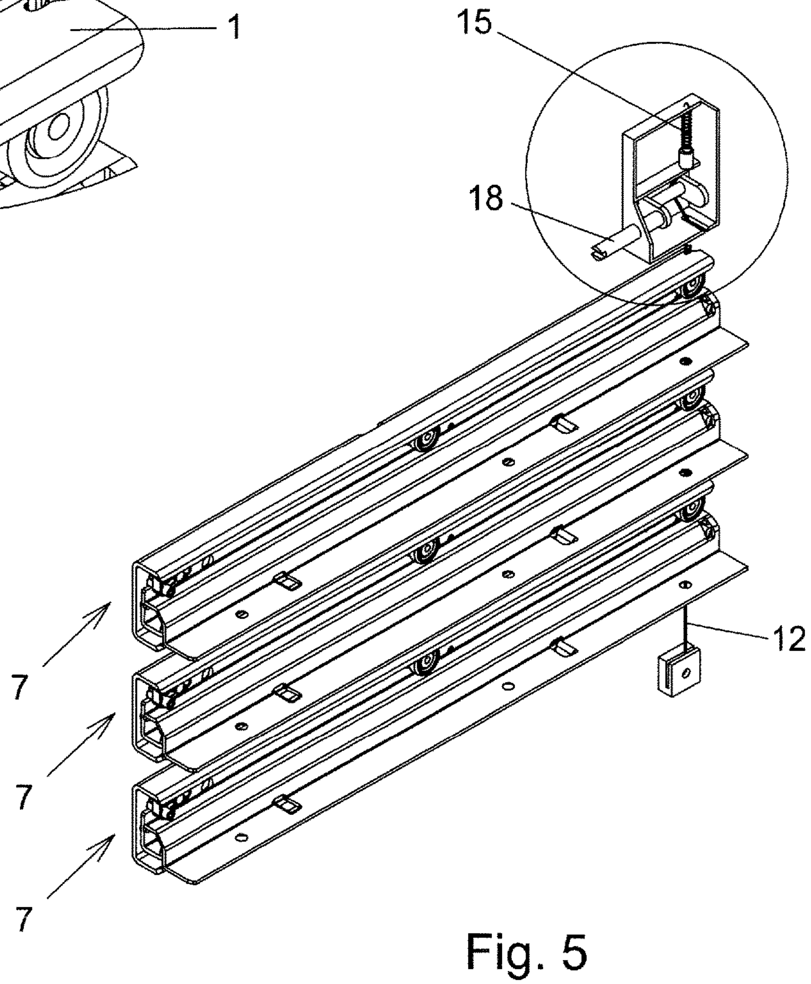
Fig. 5

Fig. 7
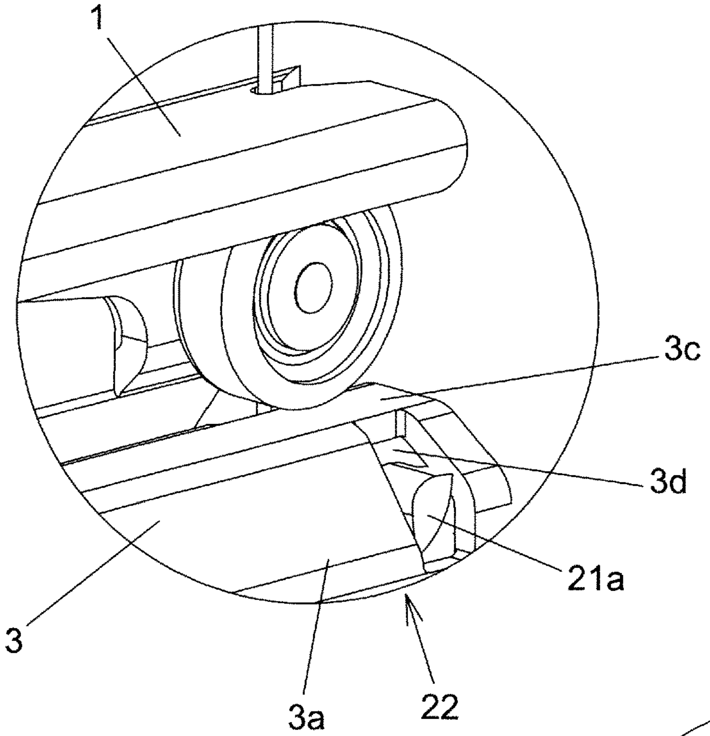
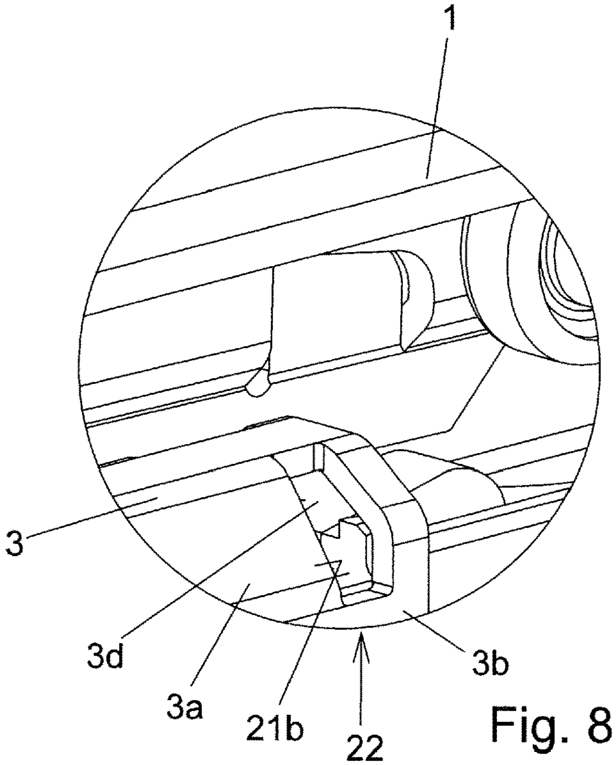
Fig. 8
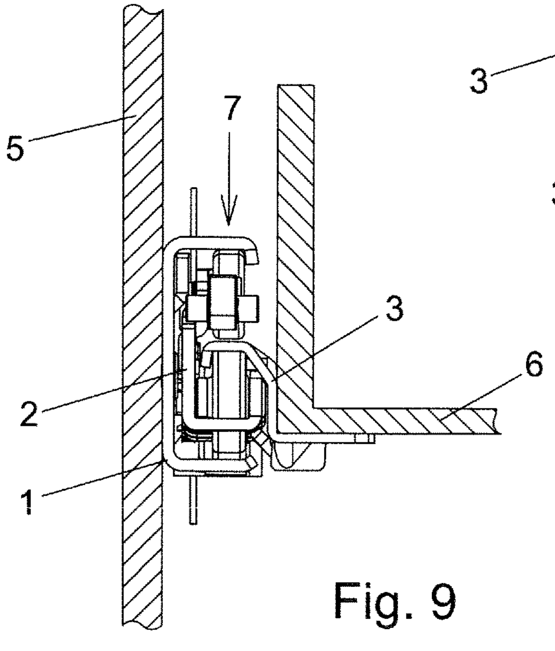
Fig. 9

Fig. 15
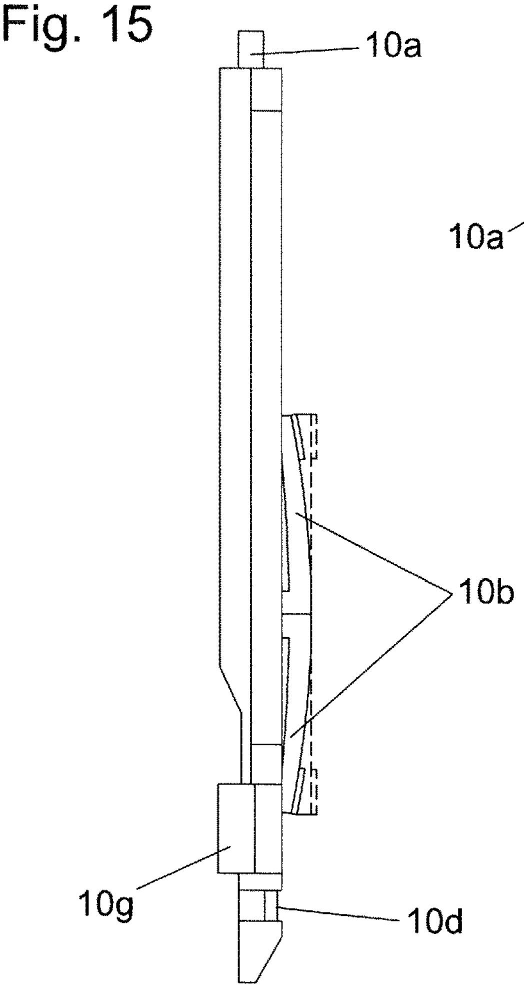
Fig. 14
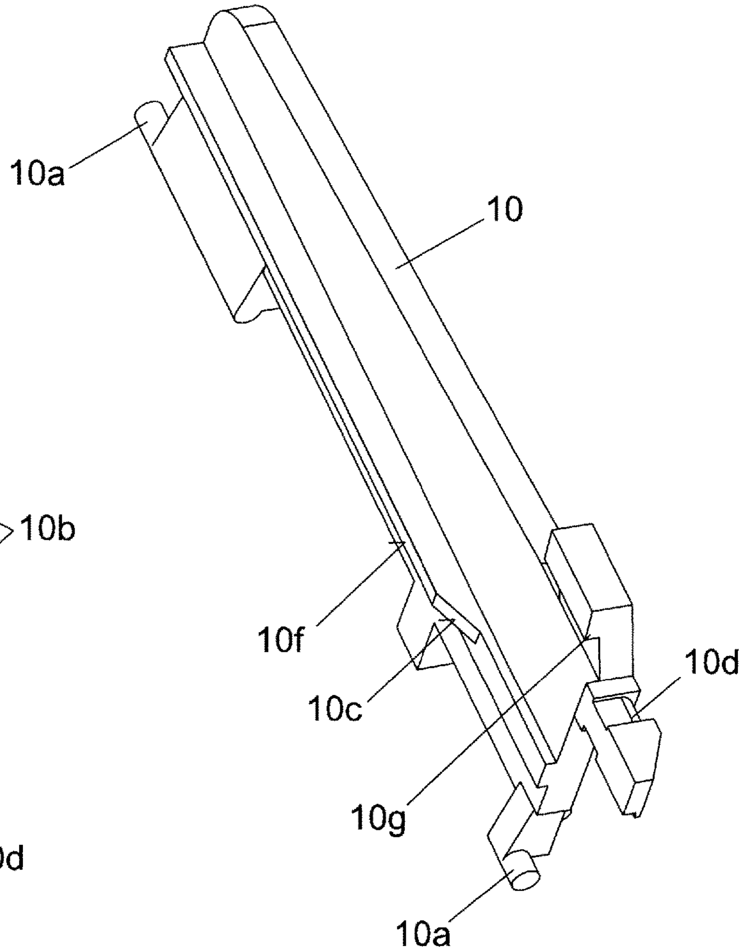
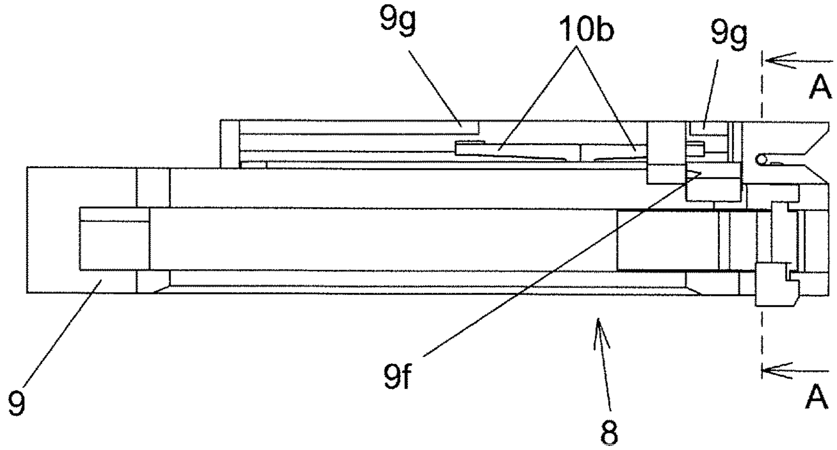
Fig. 16

Fig. 24
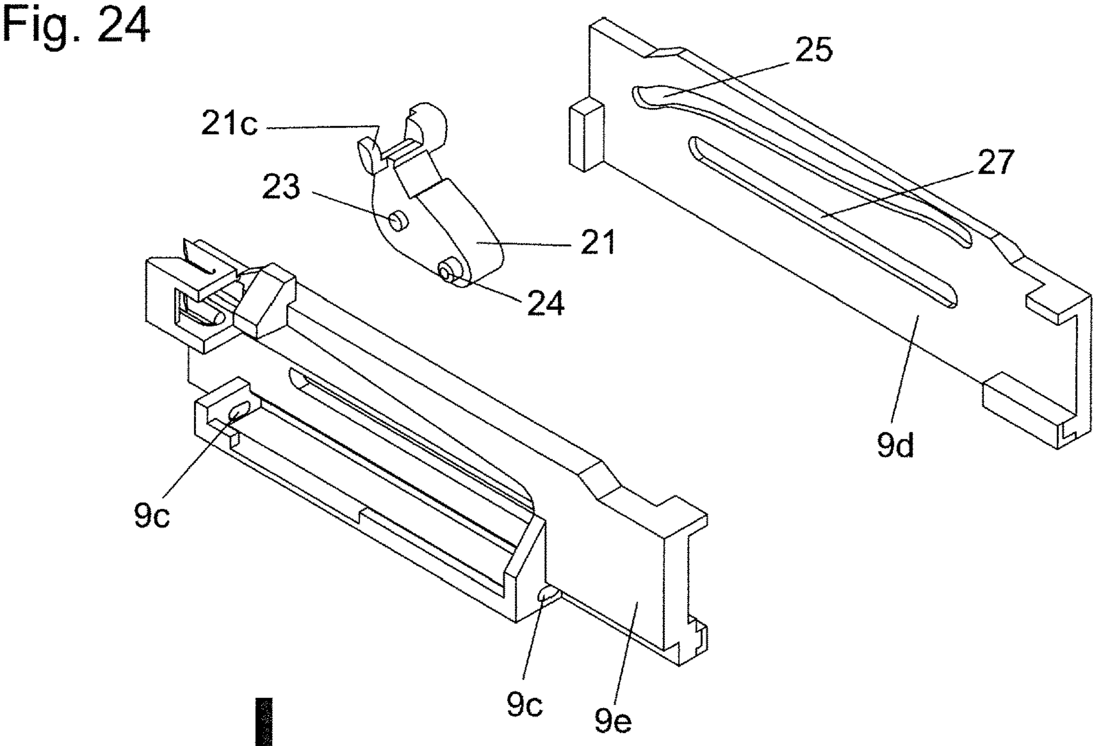
Fig. 25
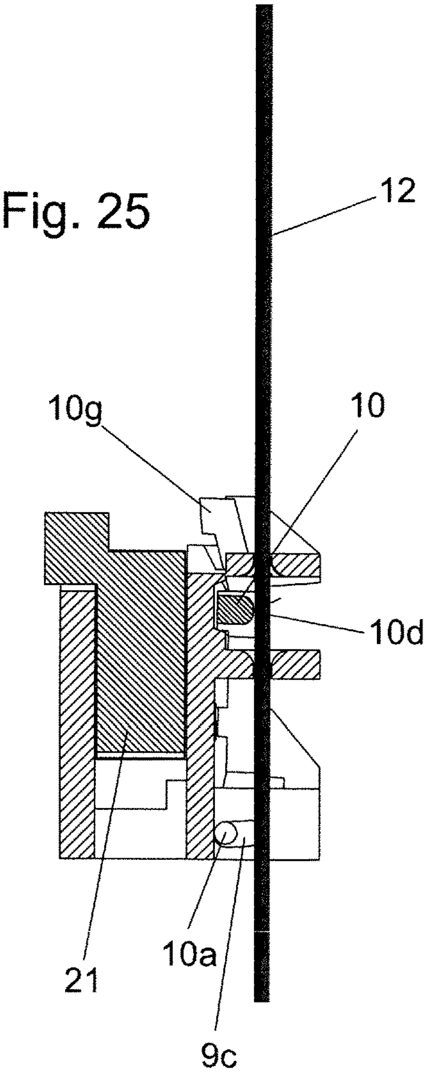
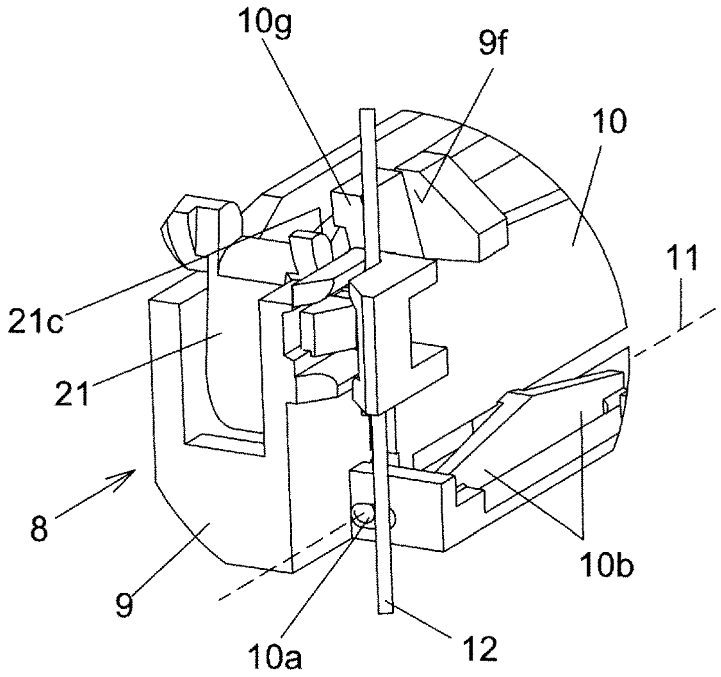
Fig. 26

PULL-OUT LOCKING DEVICE FOR DRAWERS

This U.S. national phase patent application claims priority to international patent application no. PCT/EP2021/068593, filed Jul. 6, 2021, which claims the benefit of Austria patent application no. A 157/2020, filed Jul. 15, 2020, the entire contents of which are incorporated herein by reference in their entirety.

BACKGROUND

1. Technical Field

The invention relates to a pull-out locking device for drawers, and more particularly to a pull-out locking device comprising at least two pull-out guides which each comprise a body rail which can be attached to a common furniture body and a pull-out rail which can be attached to a respective one of the drawers, which can be pulled out in a pull-out direction over a pull-out section from a closed position into a pull-out position.

2. Related Art

Pull-out locking devices serve the purpose that of a plurality of drawers arranged one above the other, in each case only one of the drawers can be pulled out whilst the other drawers are locked against pulling out. Additionally or instead of this, pull-out locking devices serve the purpose that the drawers can be stopped from being pulled out of the furniture body when these are all in the closed state.

A conventional pull-out locking device of the type mentioned initially is deduced, for example, from EP 1 500 763 A2. One bolt unit in each case is assigned to the pull-out guides arranged one above the other by means of which the drawers can be pulled out from the furniture body. This comprises a base body attached to the respective body rail from which a bolt part is displaceably mounted. The bolt parts interact with push rods of a combination of push rods.

When one of the pull-out rails of the pull-out guides is pulled out in a release state of the pull-out locking device, the bolt part is displaced from a passive position into an actuation position in which the push rod interacting with this bolt part is raised together with push rods optionally located thereabove. Raising of push rods located thereunder is thereby blocked. Since the uppermost push rod now abuts against a stop, raising of push rods located thereabove is no longer possible. Any pulling out of a pull-out rail of another pull-out guide is thereby blocked by the push rods. In order to block all the drawers in the closed state, the uppermost push rod can be blocked from raising by a lock unit. In this previously known pull-out locking device, the bolt part is arranged on a slide which is acted upon by a pull-in spring. Furthermore a tilt part is arranged in the slide which interacts with an actuating part arranged on the pull-out rail. In the passive position of the bolt part the actuating part is coupled to the tilt part. In the actuating position of the bolt part, the tilt part is tilted and the actuating part can decouple from the tilt part whereby any retraction of the bolt part is blocked by abutment of a retaining surface of the tilt part on the base body. When pushing in the drawer, the actuating part couples onto the tilt part and releases the connection of the retaining surface with the base body, whereupon the actuating part is withdrawn by the pull-in spring into the passive position.

Thus, the drawer is also pulled in. The pull-out locking device is therefore combined here with self-pull-in devices for the drawers.

In order to be able to counter a forceful pulling out of a blocked drawer with a sufficient force, the push rods must be configured to be sufficiently stable and solid. Thus, for raising the push rods, a corresponding application of force must be applied by the user when pulling out the drawer.

Further known are pull-out locking devices in which the bolt parts do not interact with push rods but with a cable-like element. For example, this can comprise a steel cable or a textile strip. When a bolt part is moved from the passive position into the actuation position, the cable-like element is deflected from the bolt part in the region of the bolt part. A first end of the cable-like element is connected unmovably to the furniture body. The second end in a displaceably limited manner against the force of a (weak) clamping spring. After the deflection by a bolt part located in the actuation position, this second end abuts against a stop so that pulling out a further pull-out is blocked. In order to block all the drawers in the pushed-in state, the displaceability of the second end of the cable-like element can be blocked by means of a lock unit. The cable-like element must be configured to receive a sufficiently large tensile force as far as possible without stretching of the cable-like element to secure a blocked drawer against forceful pulling-out. As a result of the resulting relatively large diameter, the deflection of the cable-like element by the bolt part is associated with a corresponding application of force which the user must apply when pulling out one of the drawers.

Further known, for example, from WO 2011/146952 A1 are pull-out locking devices in which the bolt parts interact with push elements other than rod-shaped elements, in particular with rotatable elements. A series of such push elements are arranged abutting against one another in a vertical guide rail. As a result of rotation of one of the push elements due to the movement of the bolt part from the passive into the actuation position, the push parts arranged above this push part are pushed upwards. A free space arranged above the uppermost push part is thus used so that no further ones of the push parts can be rotated and thus the further drawers are blocked against pulling out.

SUMMARY

It is the object of the invention to provide an advantageous pull-out locking device of the type mentioned initially in which the pull-out force to be applied by the user when pulling out a drawer can be kept small and in which nevertheless, a high resistance force can be applied against a forceful pulling-out of a blocked drawer. According to the invention, this is achieved by a pull-out locking device having the features of claim 1.

In the pull-out locking device according to the invention, in the locked state of the pull-out locking device, a respective one of the pull-out rails located in the closed position can be pulled out over a remaining section. This remaining section is less than one fifth, preferably less than one tenth, particularly preferably less than one fiftieth of the pull-out section. A preferred value for the remaining section lies in the range of 1 mm to 10 mm. In order to enable pulling out over this remaining section despite the blocking of any movement of the appurtenant bolt part from the passive position in the direction of the actuation position, a retaining spring arranged in a force transmission path between the bolt part and the base body, by which the bolt part is movably mounted, is deformed. In the locking state of the pull-out locking device, any further pulling out of the pull-out locking device beyond the remaining section is blocked by abutment of a locking portion arranged on the bolt part or connected to this on a locking surface moving together with the pull-out rail. This locking portion is therefore located in a locking position. On the other hand, in the release state of the pull-out locking device, when pulling out one of the pull-out rails starting from the closed position, the locking portion is located at least at the end of the remaining section in a released position in which the locking surface and the locking portion move past one another when the pull-out rail is pulled out further. It is thus possible to pull out a respective pull-out rail in the release position of the pull-out locking device.

In the locking state of the pull-out locking device the interaction of the bolt parts with the cable-like element or the respective push element thus not only serves to actually block the pulling-out of the pull-out rail or the drawer connected thereto but this is also accomplished by the approach of the locking surface moving together with the pull-out rail to the locking portion. The position of the locking portion is in this case controlled by pulling out the pull-out rail over the remaining section depending on whether this pulling out takes place in the release state or in the locking state of the pull-out locking device, wherein the bolt part executes a different type of movement in both states or a movement in one state and no movement in the other state. The force to be applied against a forced opening of a drawer therefore need not be applied by the cable-like element or combination of push elements. The cable-like element or the combination of push elements can thus be configured to be relatively delicate, wherein nevertheless a high resistance force can be applied against a forced opening of a drawer. The force to be applied for opening a drawer in the release state of the pull-out locking device can therefore be kept small.

The retaining spring is more favourably dimensioned to be so strong that during a pulling out of a pull-out rail in the release state of the pull-out locking device and the accompanying movement of the bolt part from the passive position into the actuation position, no deformation of the retaining spring takes place.

In one possible embodiment of the invention, the bolt part is mounted on the base body so as to be pivotable about a pivot axis located preferably parallel to the pull-out direction and the movement between the passive position and the actuation position takes place due to a pivoting about the pivot axis. In such an embodiment it can preferably be provided that the pivot axis is displaceable with respect to the base body against the force of the retaining spring in a direction at right angles to the pivot axis. When a pulling-out of one of the drawers over the remaining section takes place in the locking state of the pull-out locking device, the bolt part can thus pivot whilst deflecting the pivot axis and specifically about an axis which is formed by the contact point of the bolt part on the cable-like element or on the respective push element.

The locking surface interacting with the locking portion in the locking position of the locking portion can more favourably be arranged on the respective appurtenant actuating part. An arrangement on the respective appurtenant pull-out rail or a part connected non-displaceably to this in relation to the pull-out direction is also possible.

A respective actuating part can be formed in one piece with the respective pull-out rail, i.e. by a section of the pull-out rail. In an advantageous embodiment, the actuating parts are, however, formed by separate parts which are entrained with the pull-out rail only over an initial part of the pull-out section. Advantageously in this case the actuating parts can be mounted so as to be movable in each case by the base bodies between a base position and a waiting position and interact in each case with an entrainer device moving with the respective pull-out rail over the entire pull-out section. In this case, the respective actuating part occupies the base position in the pushed-in state of the associated pull-out rail in which the associated entrainer device is coupled to the actuating part. When pulling out the associated pull-out rail the actuating part is moved by the entrainer device into the waiting position in which the entrainer device is decoupled from the actuating part and in which the actuating part remains when the pull-out rail is pulled out further. In this case, the actuating part can be a tilt slider of a self-retracting device. A draw-in spring acting on the actuating part would be provided for this purpose, which independently pulls in the pull-out rail during pulling in after coupling of the entrainer device to the actuating part. Self-retracting devices acting in this manner are sufficiently known.

A pull-out locking device according to the invention can have a lock unit by means of which the pull-out locking device can be moved from the release position into the locking state in the closed position of all the pull-out rails. For this purpose the cable-like element can be deflected by the lock unit or a displaceability of a movably mounted end of the cable-like element can be blocked or a displaceability of the push elements or the combination of push elements can be blocked.

In an advantageous embodiment of the invention, during a movement from the passive position into the actuating position, the contact surface of a respective bolt part interacting with the cable-like element or the respective push element of the combination of push elements moves in a direction which lies substantially at right angles (i.e. in a range of 90°+1-15°) to the pull-out direction.

When there is talk of a cable-like element within the framework of this document, this means any longitudinally stretched flexible elements which can absorb a tensile force but not a compressive force in the longitudinal direction of the element. This can comprise, for example, a cable, e.g. steel cable or plastic cable, a thread, a band e.g. textile band or plastic band or a chain.

The locking portion can comprise a portion of the bolt part formed in one part. However, the configuration as an own part which is coupled to the bolt part or is moved by movement of the bolt part by the bolt part is also feasible and possible.

Within the framework of this document, "locking position" of the locking portion is designed as any position of the locking portion in which this overlaps with the locking surface in relation to the pull-out direction, i.e. at the end of pulling out, the associated pull-out rail would come to abut against the locking surface over the remaining section. Within the framework of this document, "release position" of the locking portion is designated as any position of the locking portion in which this does not overlap with the locking surface relative to the pull-out direction, i.e. when pulling out the associated pull-out rail, the locking surface runs past the locking portion at the end of the remaining section.

When there is talk of "front" and "rear" within the frame work of this document, this is related to the pull-out direction.

Further advantages and details of the invention are explained hereinafter with reference to the appended drawings. In the figures:

BRIEF DESCRIPTION OF THE DRAWINGS

FIG. 1 shows an exemplary embodiment of a pull-out locking device according to the invention with, for example, three pull-out guides arranged one above the other, wherein all the pull-out rails are in the closed position, in oblique view;

FIG. 2 shows an enlarged detail of FIG. 1;

FIG. 3 shows a diagram similar to FIG. 1 in the pull-out position of one of the pull-out rails;

FIG. 4 shows an enlarged detail of FIG. 3;

FIG. 5 shows a diagram similar to FIG. 1 in the closed position of all the pull-out rails but in the locking state of the pull-out locking device by blocking by means of the lock unit;

FIG. 6 shows an enlarged detail of FIG. 5;

FIG. 7 shows an enlarged detail in the region of the rear end of a pull-out rail located in the closed position;

FIG. 8 shows an enlarged detail in the region of the rear end of a pull-out rail located in an intermediate position;

FIG. 9 shows a front-side view of one of the pull-out guides with sections of a furniture body to which the body rail is attached and a drawer to which the pull-out rail is attached;

FIG. 14 shows an oblique view of the bolt part on the side of the bolt part facing the base body;

FIG. 15 shows a plan view of the bolt part wherein the retaining spring is shown in the deformed state in continuous lines and in the non-deformed state in dashed lines (without the action of an external force);

FIG. 16 shows a plan view of the bolt unit in the base position of the actuating part;

FIG. 24 shows a diagram similar to FIG. 23 from a different viewing direction;

FIG. 25 shows a section along the line A-A from FIG. 16;

FIG. 26 shows an oblique section of a part of the bolt unit in the region of the rear end in the base position of the actuating part;

DETAILED DESCRIPTION OF EXAMPLE EMBODIMENTS

Figure 10:
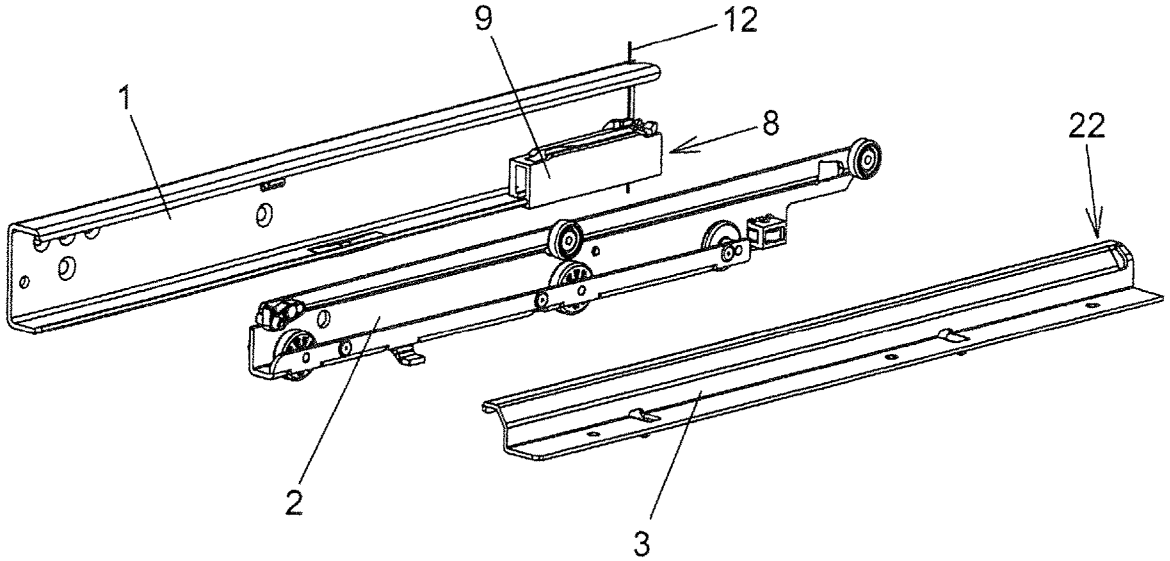
FIG. 10 shows one of the pull-out guides in an exploded state of the rails with the bolt unit attached to the body rail and a section of the cable-like element.
Figure 13:
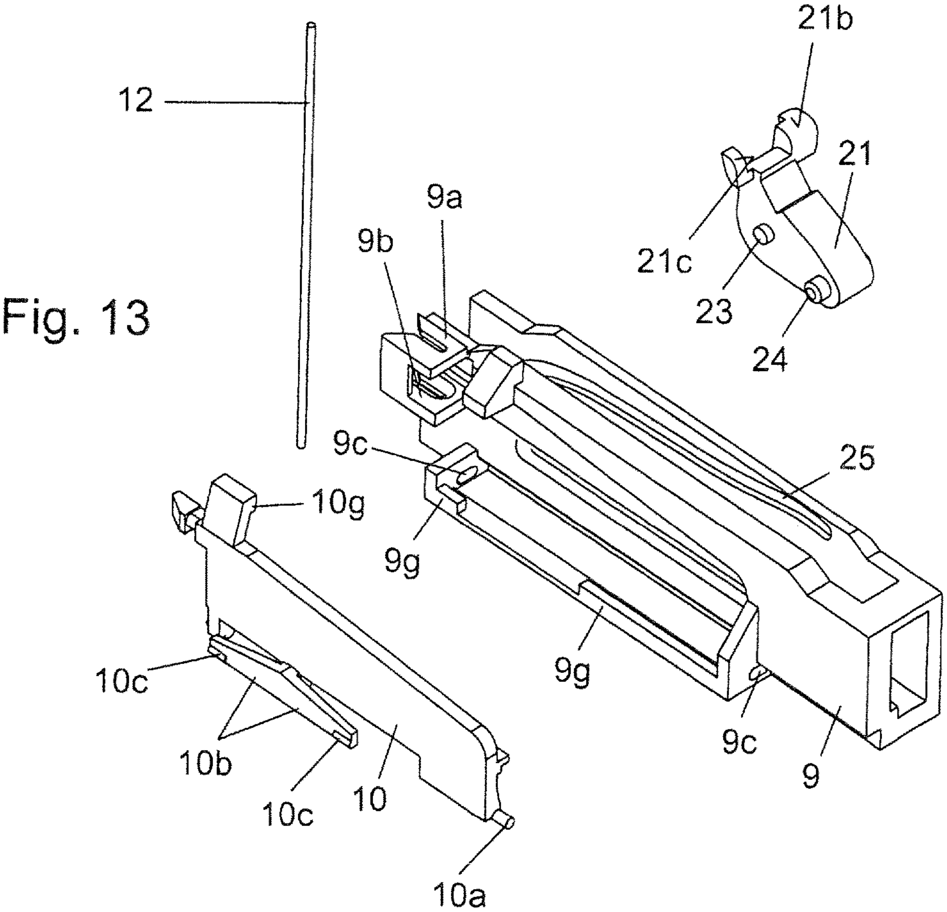
FIG. 13 shows an exploded view of the bolt unit and the portion of the cable-like element.
Figure 11:
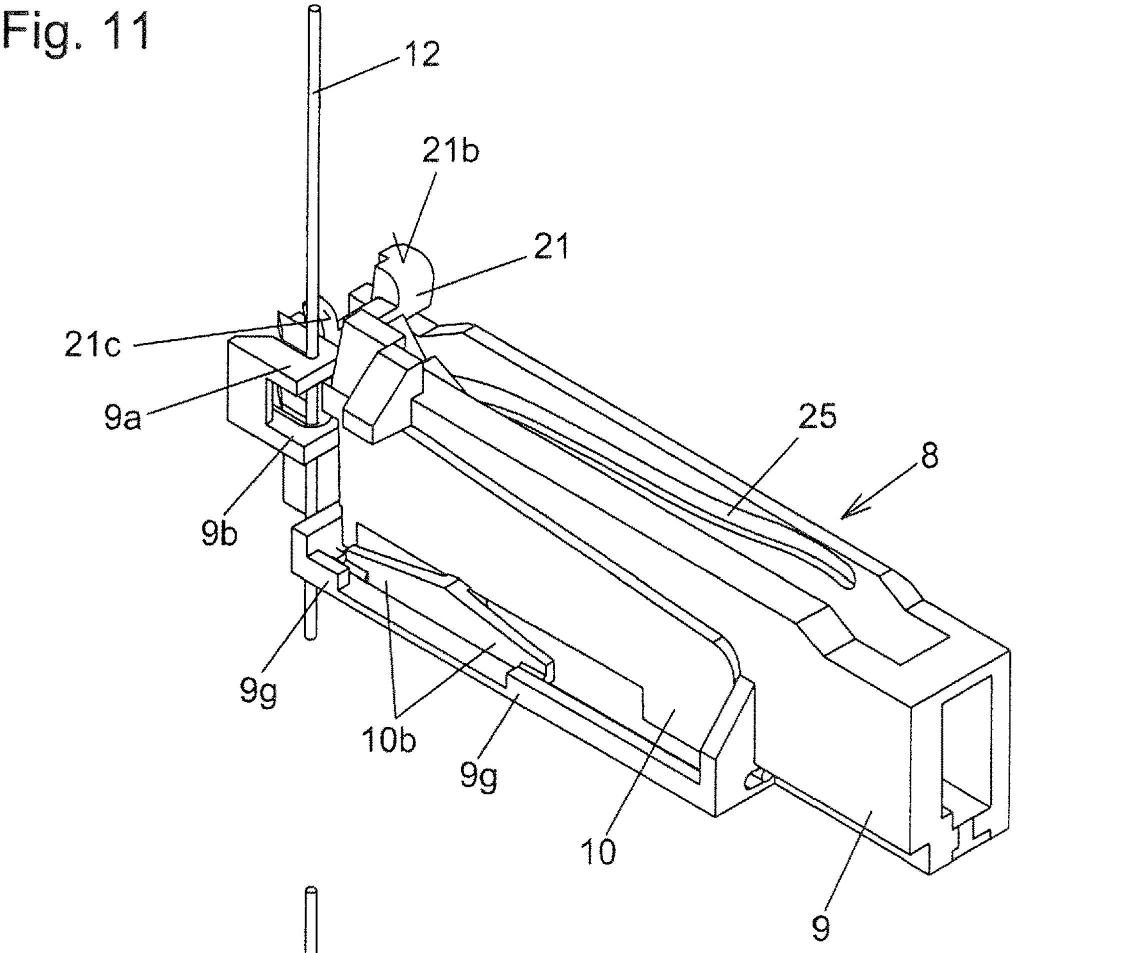
FIG. 11 shows an oblique view of one of the bolt units on the side of the bolt unit facing the body rail with a section of the cable-like element in the base position of the actuating part.

A first exemplary embodiment of the invention is shown in FIGS. 1 to 30. These show a pull-out locking device for drawers according to the invention, wherein parts of the pull-out locking device are integrated in a plurality of pull-out guides 7 arranged one above the other.

In the exemplary embodiment shown the pull-out guides each comprise a body rail 1, a middle rail 2 and a pull-out rail 3. The pull-out guides are configured here in the manner of differential pull-out guides in which the middle rail 2 in each case covers half the distance of the pull-out rail 3 when pulling out and pushing in. As shown, all the rollers are arranged on the middle rail 2. The pull-out guides can be configured in a conventional manner and the arrangements of the rollers and their mode of operation need not be explained in detail here.

A pull-out locking device according to the invention can also be integrated in different types of pull-out guides, for example, in pull-out guides which only comprise a body rail and a pull-out rail.

The pulling out of the respective pull-out rail 3 starting from the completely pushed-in state is accomplished in a pull-out direction 4, pushing in of the pull-out rail 3 takes place contrary to the pull-out direction 4.

A section of a furniture body 5 on which the body rails 1 of the pull-out guides 7 are to be mounted is only shown in FIG. 9. In addition, FIG. 9 shows a part of the drawer 6 on which the pull-out rail 3 of the pull-out guide 7 shown in FIG. 9 is mounted. The pull-out rails 3 of the other pull-out guides 7 are mounted in a similar manner on drawers 6.

A bolt unit 8 is mounted on each of the pull-out guides 7. For this purpose a base body 9 of the respective bolt unit 8 is fixed on the body rail 1 and specifically in the region of the rear end of the body rail 1.

A bolt part 10 is movably mounted on the base body 9 and specifically in the exemplary embodiment, about a pivot axis 11 located parallel to the pull-out direction 4. The pivot axis 11 is itself movable, as will be explained further below, and specifically is displaceable in a direction at right angles to the pull-out direction 4. The pivot axis 11 could therefore also be designated as pivot-slide axis.

The pull-out locking device comprises a cable-like element 12 which, for example, is configured in the form of a steel cable. The bolt parts 10 of all the bolt units 8 interact with this cable-like element 12. In the exemplary embodiment the cable-like element 12 is arranged next to the respective bolt part 10 in relation to a direction at right angles to the pull-out direction 4.

The cable-like element 12 is connected immovably to the furniture body 5 at a first end, in the exemplary embodiment by means of a connecting piece 13. In the mounted state of the pull-out locking device, the body rails 1 and the first end of the cable-like element 12 thus lie in a fixed position with respect to one another.

The second end of the cable-like element is suspended in a movably limited manner. After displacement about a movability section in the direction of the first end the movability of the second end is used up and any further movement in the direction of the first end is no longer possible. For this purpose in the exemplary embodiment the second end is attached to an end piece 14 which is attached to a suspension part 16 by means of a tension spring 15. The tension spring 15 keeps the cable-like element 12 tensioned. After displacement of the end piece 14 about the movability section in the direction of the first end of the cable-like element, the end piece 14 impinges against a stop part 17 mounted in a fixed position with respect to the furniture body 1. The cable-like element 12 is guided through a slot in the stop part 17.

A lock piece 18 of a lock unit 19 furthermore interacts with the cable-like element 12. The suspension part 16 and the stop part 17 can be parts of a base part 20 of the lock unit. The lock piece 18 is mounted rotatably in the base part 20.

In the closed position of all the pull-out rails 3, the bolt parts 10 of all the bolt units 8 are in passive positions. In the passive positions of all the bolt parts 10 and in the open state of the lock unit 19, the self-retracting device has a release state. In the release state the cable-like element 12 is not deflected by the bolt parts 10 but runs straight through the bolt units 8 and/or past these. In the release state of the pull-out locking device the cable-like element 12 is also not deflected by the lock piece 18. In the exemplary embodiment the cable-like element runs rectilinearly between the connecting piece 13 and the end piece 14. This state is shown in FIGS. 1 and 2.

FIGS. 3 and 4 shows the state after one of the pull-out rails 3 has been pulled out into the pull-out position. The bolt part 10 of the bolt unit 8 mounted on the body rail 1 of this pull-out guide 7 is now located in an actuating position in which it deflects the cable-like element 12 in the region of this bolt part 10 as can be seen, for example, in FIG. 27. The movement of the bolt part 10 from the passive position into the actuation position is accomplished by a pivoting about the pivot axis 11 whereby the cable-like element 12 has been deflected by entrainment by the bolt part 10 which abuts with a stop surface 10*d* against the cable-like element 12. Above and below the bolt part 10 of a respective bolt unit 8 the base body 9 on which the bolt part 10 is mounted, has cable guide portions 9*a*, 9*b* onto which the cable-like element 12 is pressed by the bolt part 10 in the actuating position of the bolt part 10, with the result that a vertical course of the cable-like element 12 above and below the cable guide portions 9*a*, 9*b* is also achieved in the actuation position of the bolt part 10. In the exemplary embodiment the cable guide portions 9*a*, 9*b* have slots through which the cable-like element 12 runs.

As a result of the deflection of the cable-like element 12 in the region of the bolt part 10, the second end of the cable-like element 12 has been displaced in the direction of the first end. The end piece 14 thus abuts against the stop part 17 as can be seen, for example, from FIG. 4. The pull-out locking device thus adopts the locking state in which any pulling out of the pull-out rail 3 of a further pull-out guide 7 is blocked.

The locking state of the pull-out locking device can also be achieved in the closing position of all the pull-out rails by actuation of the lock piece 18 of the lock unit 19. By twisting the lock piece 18 the eccentric portion 18*a* of the lock piece 18 comes to abut against the cable-like element 12 and deflects this, cf. in particular FIG. 6. The end piece 14 is thereby pulled to abut against the stop part 17 and any further deflection of the cable-like element 12 is thereby blocked. Underneath the lock piece 18 the lock unit 19 has a cable guide portion 19*a* for the cable-like element 12 which has a slot through which the cable-like element 12 runs so that the cable-like element 12 runs vertically underneath the cable guide portion 19*a* even in the state deflected by the lock piece 18.

For passage of the cable-like element 12 horizontal flanges of the body rail 1 of the respective pull-out guide 7 in the exemplary embodiment have slots starting from the rear end of the body rail 1.

The bolt units 8 each have an actuating part 21 which interacts with the bolt part 10 of this bolt unit 8 in order to move the bolt part from the passive position into the actuation position when pulling out the associated pull-out rail 3.

In the exemplary embodiment, the pivot axis 11 of the bolt part 10 is formed by axle pins 10*a* of the bolt part 10 which engage in axle recesses 9*c* of the base body 9. The axle recesses 9*c* are configured in the form of elongate holes. The bolt part 10 has resilient arms which form a retaining spring 10*b*. As shown (FIG. 13), curved projections 10*c* can be arranged on the resilient arms 10*b* by means of which the arms 10*b* abut against contact portions 9*g* of the base body 9. Without the action of an external force the retaining springs 10*b* formed by the arms hold the axle pins 10*a* in abutment against the ends of the axle recesses 9*c* facing the actuating part 21. The axle pins 10*a* are displaceable against the force of the retaining springs 10*b* in the direction directed away from the actuating part 21.

Figure 12:
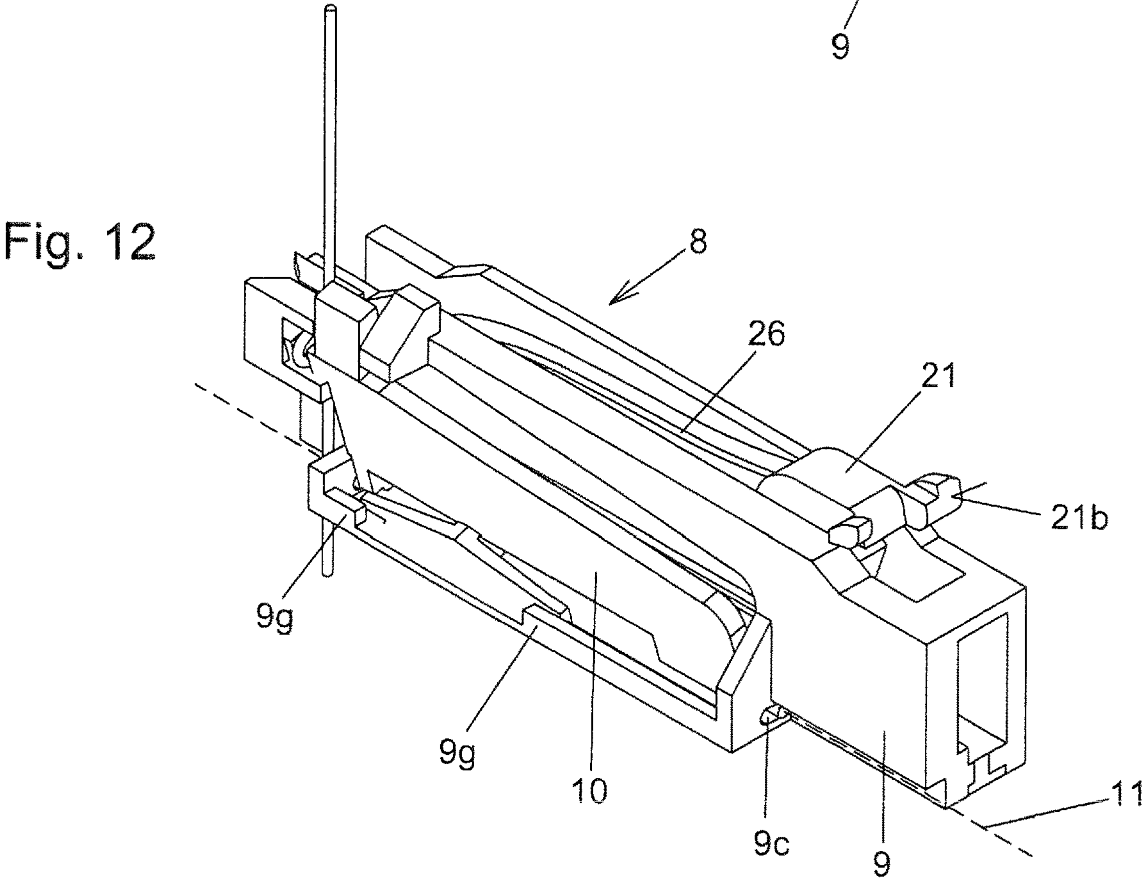
FIG. 12 shows a diagram similar to FIG. 11 in the waiting position of the actuating part.
Figure 17:
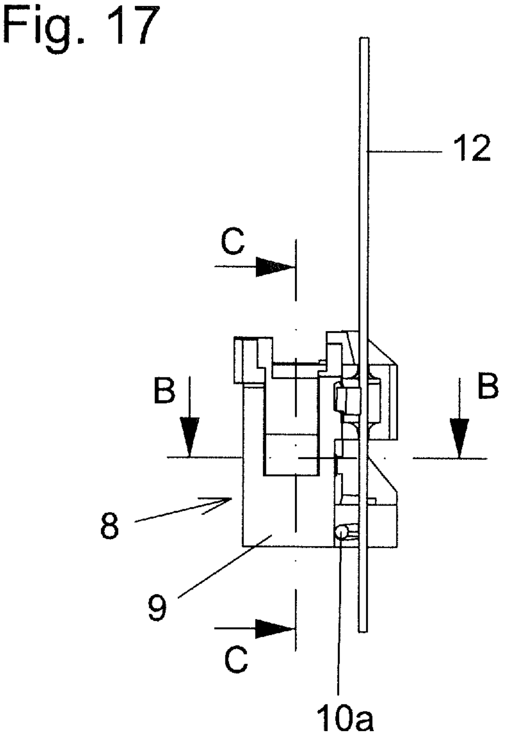
FIG. 17 shows a front view of the bolt unit in the base position of the actuating part together with the cable-like element.
Figure 21:
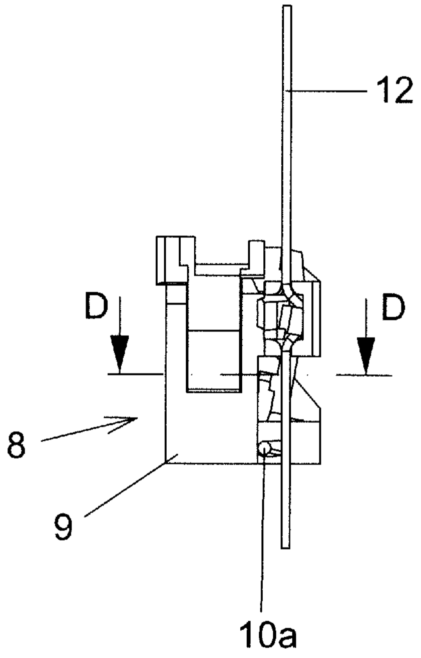
FIG. 21 shows a front view of the bolt unit in the state which this adopts after pulling out the pull-out rail over the remaining section together with the cable-like element.
Figure 18:
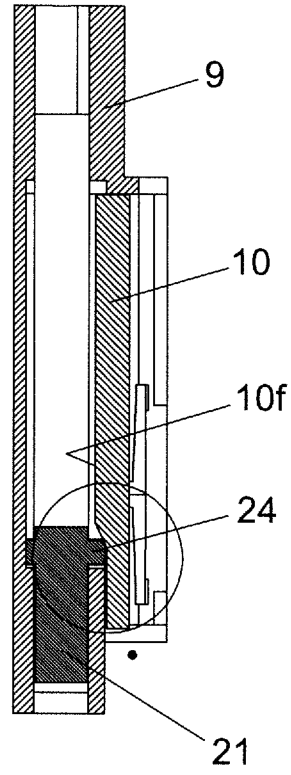
FIG. 18 shows a section along the line B-B from FIG. 17.
Figure 22:
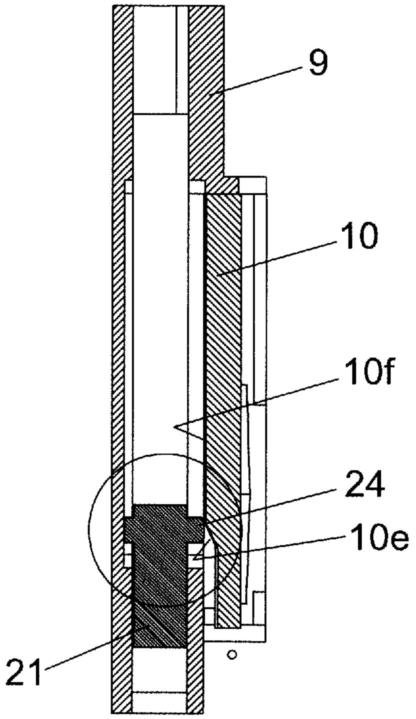
FIG. 22 shows a section along the line D-D from FIG. 20.
Figure 19:
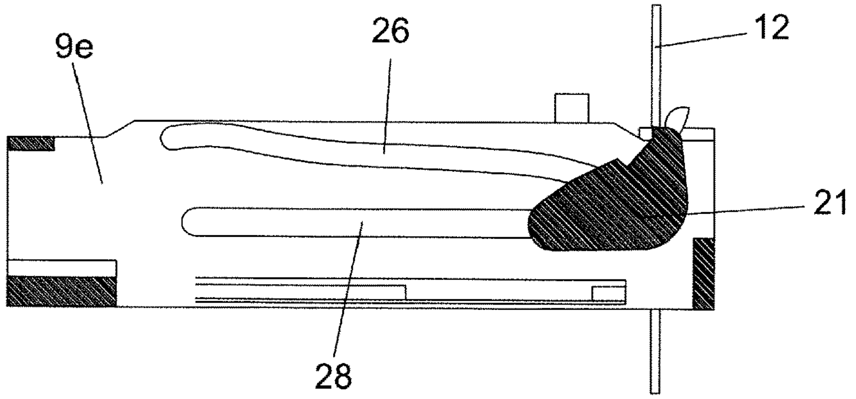
FIG. 19 shows a section along the line C-C from FIG. 17.
Figure 20:
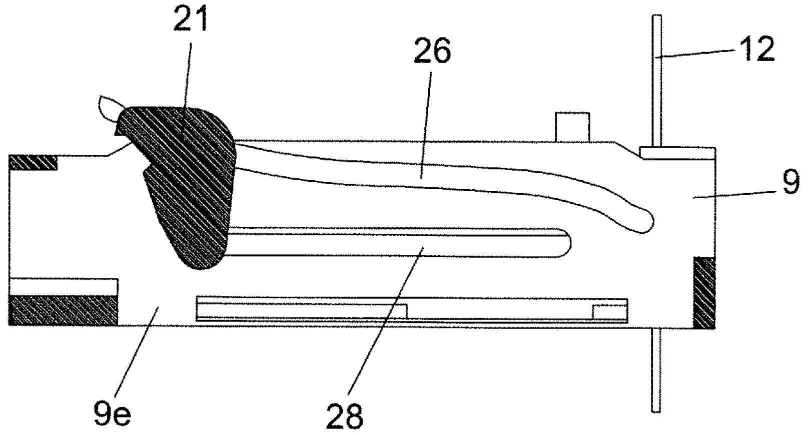
FIG. 20 shows a section similar to FIG. 19 in the waiting position of the actuating part.
Figure 23:
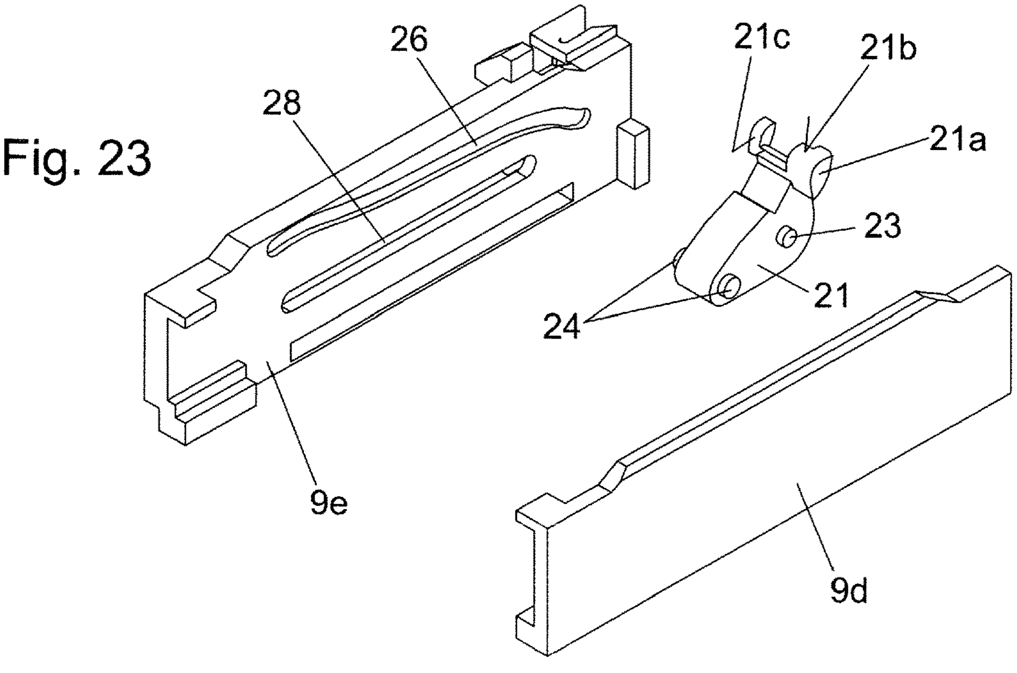
FIG. 23 shows an oblique view of the base part, cut apart in the longitudinal centre and the housing parts pulled apart, and of the actuating part.
Figure 27:
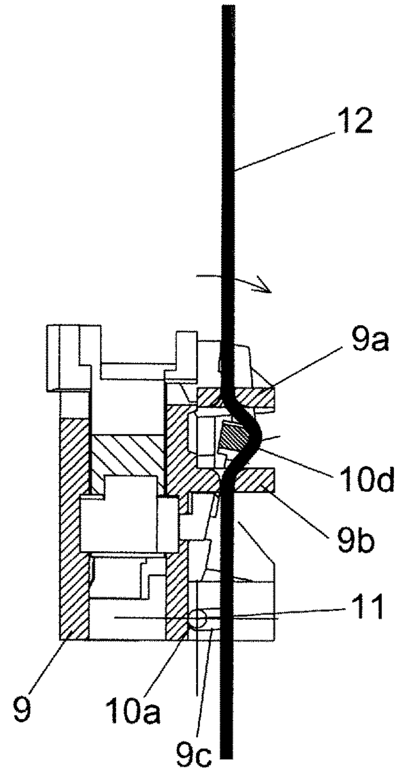
FIGS. 27 and 28 show diagrams similar to FIGS. 25 and 26 after pulling out the associated pull-out rail over the remaining section in the release state of the pull-out locking device.
Figure 28:
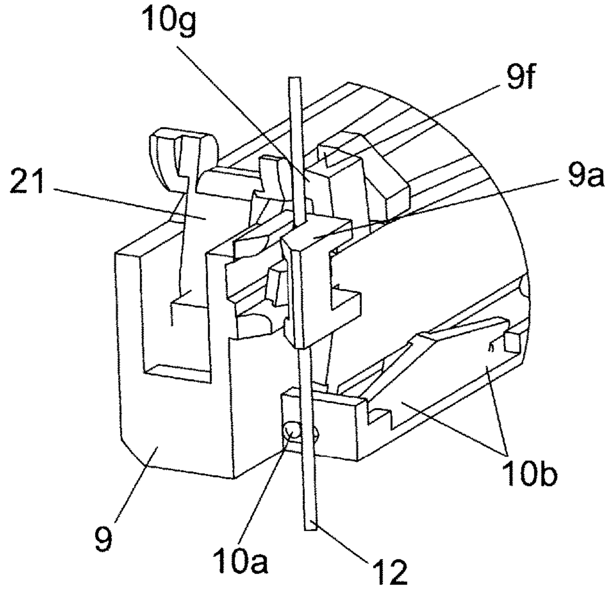

An actuating part 21 of a respective bolt unit is mounted so as to be movable by the base body 9 of this bolt unit 8 between a base position and a waiting position. In the closed position of the associated pull-out rail 3, the actuating part 21 is located in the base position, cf. FIGS. 7, 11, 16, 17, 18, 19, 25 and 26. When pulling out the pull-out rail 3, the actuating part 21 is initially entrained by an entrainer device 22 of the pull-out rail 3 starting from the closed position of the pull-out rail 3 until the actuating part 21 reaches the waiting position. The pull-out rail 3 then occupies an intermediate position between the closed position and the pull-out position. In the waiting position the entrainer device 22 previously coupled to the actuating part 21 can decouple from the actuating part 21. When the pull-out rail 3 is pulled out further, the actuating part 21 remains in the waiting position. In FIGS. 8, 12 and 20 the actuating part 21 is located in the waiting position.

During the movement from the base position into the waiting position, the actuating part 21 is displaced in the pull-out direction 4 and at least in the end region of this displacement before reaching the waiting position is tilted about an axis located at right angles to the pull-out direction 4. The actuating part 21 can thus also be designated as tilt slider.

Tilt sliders moved in a similar manner between a base position and a waiting position are also known from self-retracting devices. For this purpose the tilt slider is acted upon by a draw-in spring in the direction of the base position and in the waiting position a retaining surface of the tilt slider abuts against a stop surface of the base body in order to block a withdrawal of the tilt slider in the direction of the base position. When pushing in the pull-out rail starting from the pull-out position, the entrainer device impinges upon the tilt slider in an intermediate position of the pull-out rail, with the result that this is pivoted and the retaining surface comes out of engagement with the stop surface so that the draw-in spring can withdraw the tilt slider into the base position.

Similarly in the pull-out locking device according to the invention a respective draw-in spring can interact with the actuating part 21 of a respective bolt unit 8, which acts upon the actuating part 21 in the direction of the base position. Thus, the pull-out locking device according to the invention can be combined with a self-retracting device. The pulling in of the pull-out rail could be damped by a damper here.

In the exemplary embodiment, the entrainer device 22 interacting with the actuating part 21 which is formed in the region of the rear end of the respective pull-out rail 3, has a slot 3*d* which is arranged in a web 3*a* of the pull-out rail 3, which connects a vertical web 3*b* of the pull-out rail 3 with a horizontal web 3*c* of the pull-out rail. The horizontal web 3*c* forms a track for rollers of the middle rail. The web 3*a* connecting the vertical web 3*b* to the horizontal web 3*c* is configured to be sloping in the region in front of the slot 3*d*. In the region behind the slot 3*d* this web 3*a* has an elevated web section. The front edge of the slot 3*d* therefore lies lower (closer to the pivot axis of the actuating part 21) than the rear edge.

In the base position of the actuating part 21 a projection 21*a* of the actuating part 21 projects into the slot 3*d*. When pulling out the pull-out rail starting from the closed position, the entrainer device 22 thus initially entrains the actuating part 21 in the pull-out direction 4. During entrainment of the actuating part 21, this is pivoted shortly before reaching the waiting position so far that the projection 21*a* of the actuating part 21 can move out from the slot 3*d*. This moving out is accomplished in an intermediate position of the pull-out rail 3. When the pull-out rail 3 is pushed in starting from the pull-out position, a coupling of the entrainer device 22 onto the actuating part 21 thus takes place in the intermediate position of the pull-out rail 3. To this end, a running surface 21*b* of the actuating part 21 runs up to the front edge of the slot 3*d*, with the result that a pivoting of the actuating part 21 takes place and the projection 21*a* enters into the slot 3*d*.

In order to guide the actuating part 21 displaceably and pivotably with respect to the base body 9, in the exemplary embodiment the actuating part 21 has two protruding bearing journals 23, 24 on each side. These bearing journals project into slotted guide tracks 25-28 which are arranged in opposite side walls 9*d*, 9*e* of the base body 9, see FIGS. 23 and 24. The courses of the slotted guide tracks 25, 26 in the two side walls 9*d*, 9*e* in which the bearing journals 23 protruding on both sides engage, correspond to one another. Likewise the courses of the slotted guide tracks 27, 28 arranged in the two side walls 9*d*, 9*e* into which the bearing journals 24 protruding on opposite sides of the actuating part 21 engage, correspond to one another. The slotted guide tracks 27, 28 run rectilinearly parallel to the pull-out direction 4. In this case, the slotted guide track 28 passes through the side wall 9*e* of the base body 9 adjacent to the bolt part 10. The bearing journal 24 projecting into this slotted guide track 28 interacts with an actuating surface 10*e*, 10*f* of the bolt part 10 (see FIG. 14). The actuating surface comprises a sloping surface 10*e* and an adjoining surface portion 10*f* which runs parallel to the pull-out direction 4. In the exemplary embodiment, the sloping surface 10*e* and the surface portion 10*f* lie on the front-side edge of a protruding strip.

If one of the pull-out rails is pulled out in the closed position of all the pull-out rails 3, the bolt part 10 of the appurtenant bolt unit 8 is located initially in the passive position. The actuating part 21 located in the base position is entrained by the entrainer device 22 and displaced in the direction of the waiting position. In this case, the bearing journal 24 passing through the slotted guide track 28 comes to abut against the sloping surface 10*e*. As a result, the bolt part 10 is pivoted from the passive position into the actuating position. No deformation of the retaining spring 10*b* takes place here. At the end of a first portion of the pull-out section which is designated as "remaining section" in this document, the bolt part 10 is located in the actuation position and the bearing journal 24 has run through the sloping surface 10*e* and is located in the region of the beginning of the surface portion 10*f*.

As a result of the movement of the bolt part 10 from the passive position into the actuating position, the cable-like element 12 is deflected by the bolt part 10 in the region of this bolt unit 8 and specifically by the contact surface 10*d* of the bolt part 10 moved towards the cable-like element 12. The cable guide portions 9*a*, 9*b* of the base body 9 are located above and below the contact surface 10*d*. In the deflected state of the cable-like element 12 this therefore runs in a curved manner through the cable guide portions 9*a*, 9*b* and with an opposite curvature over the contact surface 10*d* as can be seen most clearly from FIG. 27.

A "deflection" of the cable-like element therefore means that the cable-like element is displaced in the region of the respective bolt part with respect to a zero position which it adopts in the release state of the pull-out locking device. As a result of the cable guide portions located above and below the respective bolt part, the course of the cable-like element above the upper cable guide portion and below the lower cable guide portion is not changed thereby.

Due to the deflection of the cable-like element 12, the end piece 14 abuts against the stop part 17 and a further deflection of the cable-like element is thereby blocked.

When this pull-out rail 3 is pulled out further. the bolt part 10 remains in the actuating position (as a result of this abutment of the bearing journal 24 against the surface portion 10*f*). The actuating part 21 is moved into the waiting position in which the entrainer device 22 is decoupled from the actuating part 21 and remains in this position during further pulling out of the pull-out rail 3.

As a result of the movement of the bolt part 10 from the passive position into the actuating position, a blocking portion 10*g* of the bolt part 10 is also moved from a locking position into a release position. In the closed position of the pull-out rail 3, the locking portion 10*g* thus adopts the locking position in which it overlaps with a locking surface 21*c* arranged on the actuating part 21 relative to the pull-out direction 4. In the locking position of the locking portion 10*g*, this would therefore be located in the region covered by the locking surface 21*c* during movement of the actuating part 21 from the base position into the waiting position and specifically the locking surface 21*c* would approach the locking surface 10*g* right at the end of the remaining section of the pull-out rail.

However, since at the end of pulling out the pull-out rail 3 over the remaining section the bolt unit 8 has been moved into the actuating position, the locking portion 10*g* has therefore also been moved into the release position in which the locking surface 21*c* can move past the locking portion 10*g* when pulling out the pull-out rail 3 over the remaining section.

As a result of pulling out one of the pull-out rails 3 from the closed position into the open position, the pull-out locking device has been moved from the release state into the locking state. This locking state is already present after pulling out the pull-out rail over the remaining section.

Figure 29:
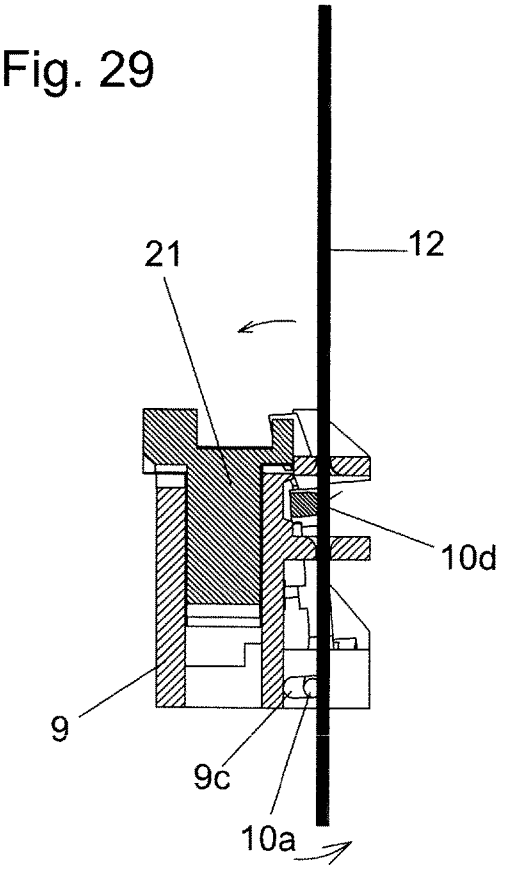
FIGS. 29 and 30 show diagrams similar to FIGS. 27 and 28 after pulling out the associated pull-out rail over the remaining section in the locking state of the pull-out locking device.
Figure 30:
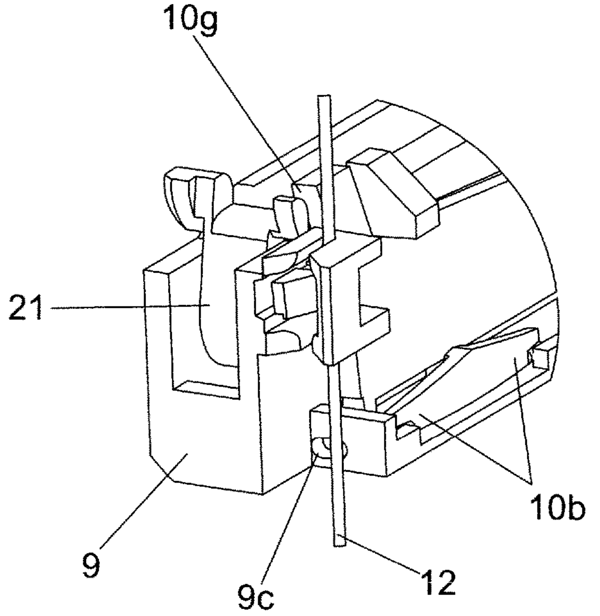

If the pull-out locking device is located in the locking state and an attempt is made to pull out one of the pull-out rails 3 located in the closed position, a pivoting of the bolt part 10 of the appurtenant bolt unit 8 from the passive position in the direction of the actuating position is blocked by the abutment of the contact surface 10*d* against the cable-like element 12 which cannot be deflected as a result of the abutment of the end piece 14 against the stop part 17. When the bearing journal 24 is displaced along the sloping surface 10*e*, this now has the result that the retaining spring 10*b* is deformed (i.e. in the exemplary embodiment the arms forming the retaining spring 10*b* are bent) and the axle pins 10*a* are displaced into the axle recesses 9*c* and specifically in the direction directed away from the actuating part 21. The bolt part 10 therefore pivots with the contact point of the contact surface 10*d* on the cable-like element 12 as the axis which lies parallel to the pull-out direction 4. During this pivoting the locking portion 10*g* of the bolt part 10 remains in a position in which it overlaps with the locking surface 21*c* relative to the pull-out direction 4 or this overlap even increases somewhat. After pulling out this pull-out rail 3 over the remaining section the locking portion 10*g* is therefore located in the locking position and at the end of the remaining section the locking portion 10*g* comes to abut against the locking surface 21*c*, with the result that a further pulling out of the pull-out rail 3 is blocked. This situation is shown in FIGS. 29 and 30.

The base body 9 has a support surface 9*f* which supports the locking portion 10*g* of the bolt part 10 located in the locking position on the side opposite the locking surface 21*c* when the actuating part 21 with the locking surface 21*a* approaches the locking portion 10*g* of the bolt part 10. The stability of the locking of the locking portion 10*g* is thereby increased.

When the pull-out locking device has been moved into the locking state by closing the lock unit 19, a pulling-out of any one of the pull-out rails located in the closed position at the end of the remaining section is blocked and specifically in precisely the same way as described previously for the case that after pulling out one of the pull-out rails (in the open state of the lock), an attempt is made to pull out a further one of the pull-out rails.

The remaining section preferably lies in the range of 1 mm to 10 mm. When the pulling-out of the pull-out rails at the end of the remaining section is locked, no engagement in the drawer is therefore possible.

In the exemplary embodiment shown, the movement of the pull-out locking device into the locking state by means of the bolt unit 19 is accomplished by a deflection of the cable-like element 12. Instead of this, a blocking element could also be inserted between the end piece 14 and the stop part 17 so that any deflection of the cable-like element 12 by the bolt part 10 of one of the bolt units 8 is blocked.

In the exemplary embodiment, the locking surface 21*c* is arranged on the actuating part 21. Over the remaining section and an adjoining further portion of the pulling-out, the actuating part 21 is entrained by the pull-out rail 3 during pulling out (until the waiting position of the actuating part 21 is reached). Instead of this, the locking surface could also be arranged directly on the pull-out rail 3 or on a part rigidly connected to the pull-out rail 3.

In the exemplary embodiment, the locking portion 10*g* is formed in one piece with the bolt part 10. Instead of this, the locking portion 10*g* could also be arranged on a separate part which is coupled to the bolt part 10 so that a movement of the bolt part 10 is accompanied by a movement of this part having the locking portion.

Instead of an actuating part 21 which is formed, as shown, by a one-piece tilt slider, the actuating part 21 could also be formed in two parts comprising a slide mounted parallel to the pull-out direction 4 from the base body 9 and a tilt part mounted on the slide so as to be able to pivot about an axis at right angles to the pull-out direction. Such two-part sliders are also known in connection with self-retracting devices, for example, according to the prior art mentioned initially.

The slider or also the tilt part could also form the actuating part interacting with the bolt part 10 in order to move the bolt part between the passive position and the actuation position.

Further possible exemplary embodiments of the invention are shown simplified and highly schematically in FIGS. 31 to 35. The differences from the previously described first exemplary embodiment of the invention are explained hereinafter. Apart from the differences which are explained, the configuration corresponds to that of the first exemplary embodiment in each case and the description of the first exemplary embodiment together with the variants described can be used in this respect in a similar manner.

Figure 31:
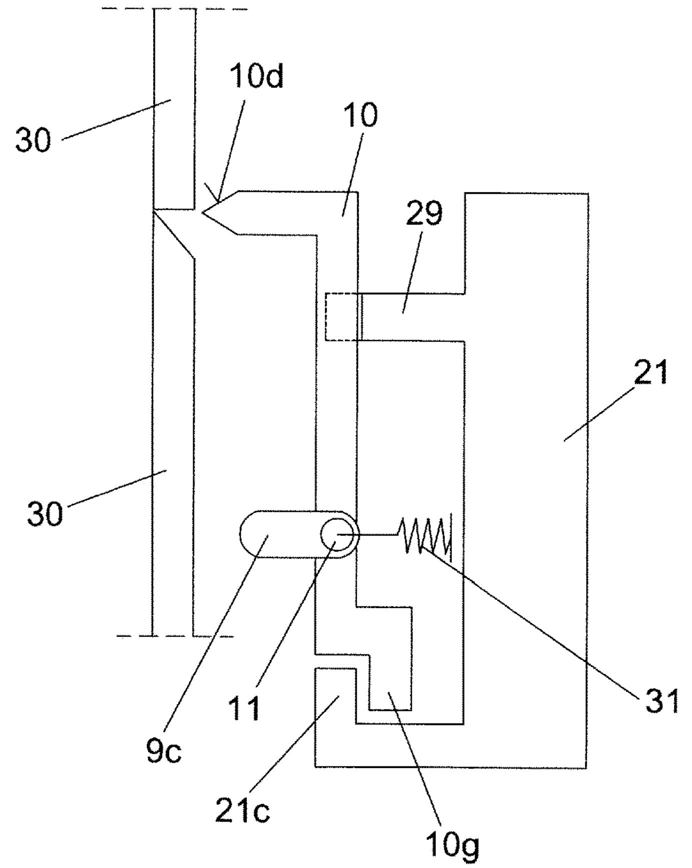
FIGS. 31 to 35 show schematic diagrams of further exemplary embodiments of the invention.

A second exemplary embodiment of the invention is shown schematically in cross-section in FIG. 31 (similar to FIG. 25). The actuating part 21 is shown schematically here as a slider mounted so as to be displaceable parallel to the pull-out direction 4 between the base position and the waiting position by a base body not shown in FIG. 31 for simplicity. A tilt part, which is not shown in the figure, could be mounted displaceably on this for coupling and decoupling an entrainer device. However, the actuating part 21 could also be configured in the form of a tilt slider similarly to the tilt slider described in the first exemplary embodiment.

A sloping surface which is here arranged on a projection 29 of the actuating part 21 is used to move the bolt part 10 between the passive position and actuating position. In FIG. 31 in which the passive position of the bolt part is shown in the release state of the pull-out locking device, the extension of the sloping surface is shown schematically by dashed lines. However, the sloping surface could also be arranged on the bolt part 10 similarly to the first exemplary embodiment. Conversely, in the first exemplary embodiment the sloping surface could also be arranged on the actuating part 21.

A further difference from the first exemplary embodiment consists in that no cable-like element 12 is provided here but rod-like push elements 30 which together form a combination of push elements with which the bolt parts of the bolt units assigned to the individual pull-out guides interact, as is known from pull-out locking devices according to the prior art. When one of the pull-out rails is pulled out, the bolt part 10 of the associated bolt unit is moved from the passive position into the actuation position, here by pivoting about the pivot axis 11. This pivot axis 11 is formed, for example, by at least one axle pin which engages in one or a respective axle recess 9*c* of the base body. When the bolt part 10 is pivoted into the actuating position, the upper push element and with this push elements possibly located further above are raised as a result of the sloping contact surface 10*d* of the bolt part 10. As a result, in the case of bolt units located above the depicted bolt unit, the tips of the bolt parts come to abut against the side wall of the respectively lower push element and the bolt parts are blocked against any movement from the passive position in the direction of the actuating position. For the push rod shown at the bottom in FIG. 31 and push rods optionally located thereunder, raising is blocked when the depicted bolt part is located in the actuating position. Any movement of bolt parts 10 from bolt units optionally located thereunder from the passive position in the direction of the actuating position is thereby blocked.

Instead of a combination of push elements, in this exemplary embodiment a cable-like element could also be provided, as in the first exemplary embodiment. Conversely, instead of a cable-like element a combination of push elements could also be provided in the first exemplary embodiment and the bolt parts could be configured to be suitably adapted.

A combination of push elements could also be formed from push elements other than rod-shaped.

In the exemplary embodiment shown in FIG. 31, the locking portion 10*g* arranged on the bolt part 10 is also located in the release position when the bolt part 10 is located in the passive position. When the bolt part is moved from the passive position into the actuation position, the release position is maintained.

When, however, in the locking state of the pull-out locking device a pull-out rail 3 is pulled out in the closed position and the actuating part 21 is at least initially moved together with this, a movement of the bolt parts 10 from the passive position in the direction of the actuating position is blocked by the combination of locking elements. Over the remaining section of the pull-out section, this results in a pivoting of the bolt part about the contact point on the respective push element 30, whereby the pivot axis 11 is displaced in the at least one axle recess 9*c* formed as an elongate hole accompanied by deformation of the retaining spring 31. The retaining spring 31 is here configured as a helical spring which acts between the axle pin and the base body. As a result of the displacement of the pivot axis 11, the locking portion 10*g* comes to overlap (in relation to the pull-out direction 4) with the locking surface 21*c* arranged on the actuating part 21. Thus, the locking portion 10*g* is located in the locking position. At the end of the remaining section this results in abutment of the locking surface 21*a* against the locking portion 10*g*, with the result that any further pulling-out of the pull-out rail is blocked.

Figure 32:
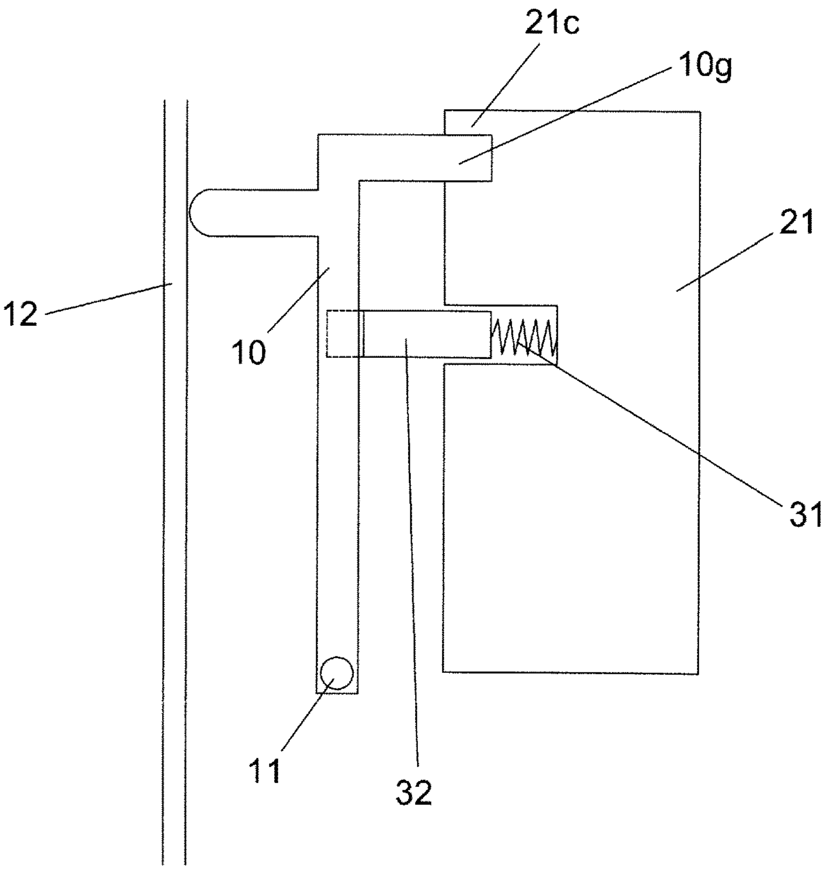

A third exemplary embodiment of the invention is shown in FIG. 32. The bolt part 10 here interacts with a cable-like element 12. An interaction with a push element of a combination of push elements would also be feasible and possible.

The actuating part 21 is in operative communication with the bolt part 10 via a transmission part 32. Located on the transmission part 32 is the sloping surface which moves the bolt part between the passive position and the actuation position, which interacts with the bolt part 10. Again it would also be feasible and possible that the sloping surface is arranged on the bolt part 10 and interacts with the transmission part 32. The transmission part 32 is mounted displaceably in a recess of the actuating part 21 and is pressed by a retaining spring 31 against the bolt part 10.

In the passive position of the bolt part 10, a locking portion 10*g* of the bolt part 10 is located in the locking position. When, in the release state of the pull-out locking device, the appurtenant pull-out rail 3 is pulled out starting from the closed position and the actuating part 21 is thereby initially entrained, before the locking surface 21*c* of the actuating part 21 approaches the locking portion 10*g* of the bolt part 10, the bolt part 10 is moved over the remaining section due to the sloping surface of the transmission part 32 whilst deflecting the cable-like element 12 from the passive position into the actuating position, in this exemplary embodiment pivoted about the pivot axis 11 for this purpose. The retaining spring 31 is hereby again dimensioned so that it does not yield. At the end of the remaining section the locking portion 10*g* is brought out of overlap with the locking surface 21*c* and the actuating part 21 can move past the bolt part 10. If the pulling out of the pull-out rail 3 assigned to the depicted bolt unit takes place in the locking state of the pull-out locking device, the cable-like element 12 blocks any movement of the bolt part 10 from the passive position into the actuation position. During pulling-out over the remaining section, the transmission part 32 is pressed into the recess of the actuating part 21 against the force of the retaining spring 31 and accompanied by deformation of the retaining spring 31. The locking portion 10*g* thus remains in the locking position and at the end of the remaining section the locking surface 21*c* of the actuating part 21 approaches the locking portion 10*g* and further pulling-out of the associated pull-out rail 3 is blocked. In this exemplary embodiment also, a combination of push elements could be provided instead of the cable-like element 12.

Figure 33:
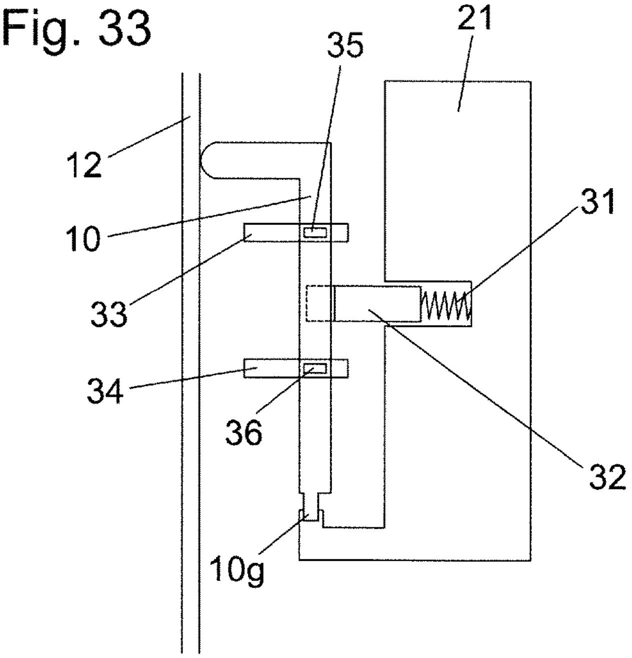

A fourth exemplary embodiment of the invention is shown in FIG. 33. This exemplary embodiment is configured similarly to the third exemplary embodiment. Here also a transmission part 32 can be pressed into a recess of the actuating part 21 against the force of a retaining spring 31. Likewise, the locking portion 10*g* of the bolt part 10 is located in the passive position of the bolt part 10 in its locking position. Here however, during the movement between the passive position and the actuating position, the bolt part 10 is not mounted so as to be pivotable about a pivot axis but so as to be displaceable rectilinearly from the base part at right angles to the pull-out direction 4. For example, grooves 33, 34 can be provided in the base part 4 in which guide lugs 35, 36 of the bolt part 10 engage.

Here also instead of the cable-like element 12 a combination of push elements could be provided here.

In the third and fourth exemplary embodiment, the transmission part 32 could also be mounted displaceably against the force of a retaining spring in a recess of the bolt part. The transmission part 32 could then have a sloping surface interacting with the actuating part 21 or a sloping surface interacting with the transmission part could be arranged on the transmission part.

Figure 34:
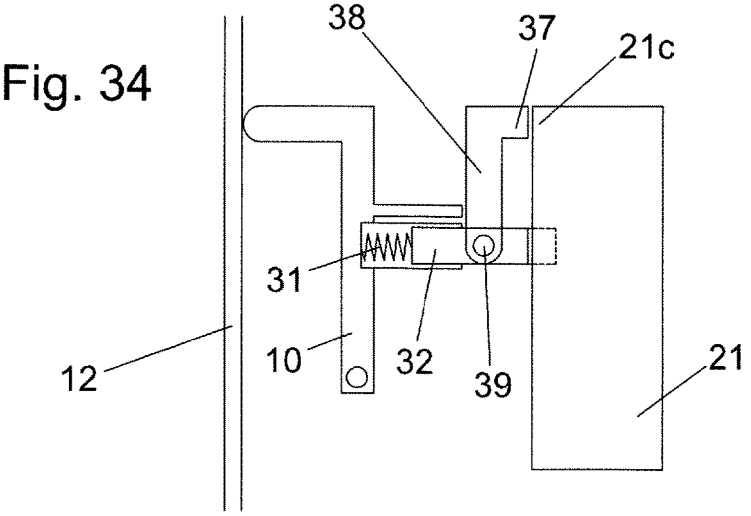

A fifth exemplary embodiment of the invention is shown in FIG. 34. The transmission part 32 is displaceably mounted here in a recess of the bolt part 10 against the force of the retaining spring 31 and has a sloping surface interacting with the actuating part 21. In contrast to the previously depicted exemplary embodiments, the locking portion 37 is arranged here on a separate component, which is configured as pivot arm 38. This pivot arm 38 is mounted pivotably about an axis 39 on the transmission part 32. In the pushed-in state of the appurtenant pull-out rail the locking portion 37 adopts the release position in this exemplary embodiment. The locking portion remains in this position when the appurtenant pull-out rail is pulled out in the release state of the pull-out locking device, wherein the bolt part 10 can be moved over the remaining section of the pull-out section towards the cable-like element 12 (instead of this a combination of push elements could again be provided), whereby the cable-like element 12 is deflected and the retaining spring 31 does not yield. If, on the other hand, the pull-out rail is pulled out over the remaining section in the locking state of the pull-out locking device, the transmission part 32 is pressed into the recess in the bolt part 10 accompanied by deformation of the retaining spring 31 and the adjusting arm 40 of the bolt part 10 runs onto the pivot arm 38 and pivots this about the axis 39 into the locking position in which the locking portion 37 overlaps with the locking surface 21*c* on the actuating part 21 in relation to the pull-out direction 4. Further pulling-out of the pull-out rail is then blocked at the end of the remaining section.

In the previously described exemplary embodiments the bolt part 10 is actuated in each case by an actuating part 21 which is entrained by the respective pull-out rail during pulling out starting from the closed position of the pull-out rail at least over a first portion of the pulling out which in any case comprises the remaining section and is then decoupled from the pull-out rail. Instead, the actuating part could also be rigidly connected to the pull-out rail or formed by a portion of the pull-out rail itself.

Figure 35:
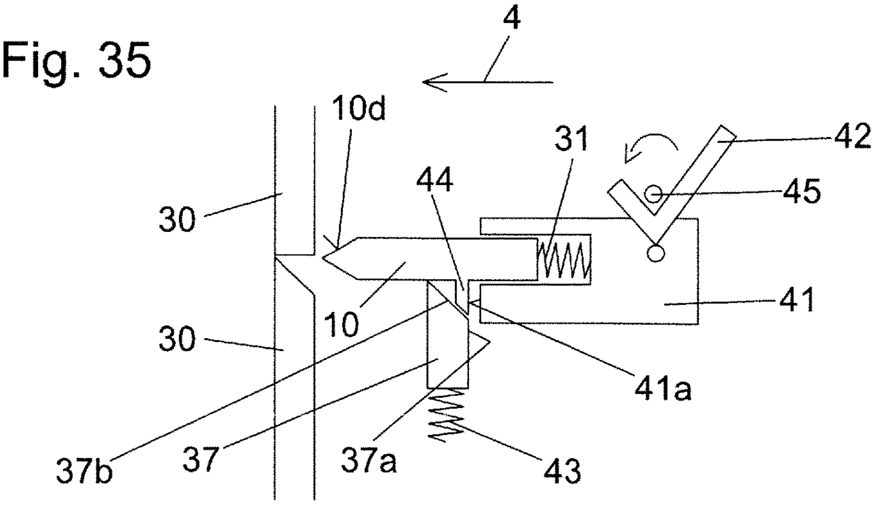

A sixth exemplary embodiment of the invention is shown in FIG. 35. This exemplary embodiment is shown in a schematic longitudinal section parallel to the pull-out direction 4. The respective bolt part 10 here interacts with a combination of push elements which is arranged in front of the bolt part 10 in relation to the pull-out direction. Instead of the combination of push elements a cable-like element could again be provided. The bolt part is displaceably mounted in a recess of a slider 41 against the force of a retaining spring 31. The slider 41 is mounted so as to be displaceable from a base body of the respective bolt unit not shown in FIG. 35 parallel to the pull-out direction 4 and specifically from a base position which is adopted by the slider 41 in the closed position of the associated pull-out rail into a waiting position which is adopted by the slider in the pull-out position of the associated pull-out rail 3. The slider 41 is hereby entrained by an actuating part 45 which is formed by a part of the pull-out rail 3 or a part rigidly connected therewith. The actuating part 45 interacts with a tilt part 42. In the base position of the slider 41 the tilt part 42 is coupled to the actuating part 45, for example, whereby the actuating part 45 is located in a recess of the tilt part 42. During the pulling-out of the associated pull-out rail and the displacement of the slider 41, the tilt part 42 is pivoted until it reaches the waiting position of the slider 41 so far (the pivot direction is indicated by an arrow in FIG. 35) that the actuating part 45 can decouple from the tilt part 42 in an intermediate position of the pull-out rail. The slider 41 remains in the waiting position during further pulling out of the pull-out rail 3. In this case, a retaining surface of the tilt part 42 can abut against a contact surface of the base body with the result that a return of the slider in the direction of the base position is blocked. During movement of the slider from the base position into the waiting position, the bolt part 10 is entrained, whereby no deformation of the retaining spring 31 results. The bolt part 10 thereby moves from the passive position into the actuation position in which it interacts with a combination of push elements or a cable-like element provided instead and thereby moves the pull-out locking device from the release state into the locking state.

During movement of the bolt part 10 from the passive position in the direction of the actuation position, the bolt part 10 moves a locking portion 37, which in this exemplary embodiment is again formed by a separate component and is mounted displaceably from the base body in a direction at right angles to the pull-out direction 4 and specifically against the force of a contact pressure spring 43. The locking portion 37 adopts a locking position in the passive position of the bolt part 10 in which a locking surface 37*a* of the locking portion 37 overlaps with a locking surface 41*a* arranged on the slider 41 in relation to the pull-out direction 4. During movement of the bolt part 10 from the passive position in the direction of the actuating position, an adjusting projection 37*a* of the locking portion 37 interacts with a sloping surface 37*b* of the locking portion 37 with the result that the locking portion is moved from the locking position into the release position before the locking surface 41*a* of the slider runs onto the locking surface 37*a* of the locking portion 37. On the contrary, the slider comes into engagement with the sloping surface 37*b* of the locking portion and can displace the locking portion further against the force of the contact pressure spring.

During retraction of the pull-out rail starting from the pull-out position, the actuating part 45 couples onto the tilt part 42 in the intermediate position of the pull-out rail and pivots this, with the result that the retaining surface of the tilt part 42 comes out of engagement with the contact surface of the base body. The slider 41 can thus be displaced back into the base position and the bolt part 10 is moved back into the passive position.

If a pull-out rail located in the closed position is pulled out in the locking state of the pull-out locking device, a movement of the bolt part 10 from the passive position in the direction of the actuation position is blocked by the combination of push elements (or the cable-like element). During movement of the slider 41 from the base position into the waiting position, the bolt part 10 thus travels into the recess until at the end of the remaining section the locking surface 41*a* of the slider 41 comes to abut against the locking surface 37*a* of the locking portion 37 and any further pulling out of the pull-out rail is blocked.

It would be feasible and possible that a draw-in spring interacts with the respective slider 41 and acts upon this in the direction of the base position with the result that a self-retracting device can be formed for the respective drawer. The pulling-in can also be damped by a damper in this case.

The invention claimed is:

1. A pull-out locking device for drawers, comprising:

at least two pull-out guides which each comprise a body rail which can be attached to a common furniture body and a pull-out rail which can be attached to a respective one of the drawers, which can be pulled out in a pull-out direction over a pull-out section from a closed position into a pull-out position, bolt units assigned to the pull-out guides, which each comprise a base body attached to the body rail and a bolt part mounted so as to be movable on the base body between a passive position and an actuation position, wherein the bolt part is mounted pivotably about a pivot axis on the base body and the movement between the passive position and the actuation position is accomplished by a pivoting about the pivot axis, wherein the bolt parts interact with a cable element of the pull-out locking device or with a respective push element of a combination of push elements of the pull-out locking device, wherein in a release state of the pull-out locking device when pulling out one of the pull-out rails, the bolt part of said pull-out rail is moved by an actuating part moved together with said pull-out rail at least over an initial part of the pull-out section from the passive position into the actuation position, whereby the cable element is deflected in the region of the bolt part by the bolt part or the push element, with which the bolt part interacts, is displaced by the bolt part and wherein in a locking state of the pull-out locking device and said pull-out rails located in the closed position, a movement of the bolt parts from the passive position in the direction of the actuation position is blocked by the cable element or by the push element interacting with the respective bolt part, wherein in the locking state of the pull-out locking device, a respective one of the pull-out rails located in the closed position can be pulled out over a remaining section that is less than ⅕ of the pull-out section, wherein due to the blocking of the movement of the bolt part from the passive position in the direction of the actuation position, a retaining spring arranged in a force transmission path between the bolt part and the base body, by which the bolt part is mounted, is deformed, the pivot axis being displaceable with respect to the base body against the force of the retaining spring, in the locking state of the pull-out locking device, at least after pulling out one of the pull-out rails located in the closed position over the remaining section, a locking portion arranged on the bolt part or actuated by the bolt part is located in a locking position in which the locking portion blocks any further pull-out of said pull-out rail by abutting against a locking surface moving together with said pull-out rail, and in the release state of the pull-out locking device, when pulling out one of the pull-out rails starting from the closed position, the locking portion is located at least at the end of the remaining section in a in which released position the locking surface and the locking portion move past one another when the pull-out rail is pulled out further.

2. The pull-out locking device according to claim 1, wherein in the closed position of a respective pull-out rail, the respective locking portion is located in the locking position and in the release state of the pull-out locking device when pulling out the pull-out rail over the remaining section, enters into the release state due to the movement of the bolt part from the passive position in the direction of the actuation position and in the locking state of the pull-out locking device, after pulling out the pull-out rail over the remaining section, is located in the locking position as previously due to the blocking of the movement of the bolt part in the direction of the actuation position.

3. The pull-out locking device according to claim 1, wherein in the closed position of a respective pull-out rail, the respective locking portion is located in the release position and in the release state of the pull-out locking device after pulling out the pull-out rail over the remaining section in which the bolt part is moved from the passive position in the direction of the actuation position, is located as previously in the release position and in the locking state of the pull-out locking device when pulling out the pull-out rail over the remaining section in which a movement of the bolt part in the direction of the actuation position is blocked, is moved into the locking position by an adjusting movement of the bolt part accompanying the deformation of the retaining spring or a transmission part arranged between the bolt part and the actuating part, which is acted upon by the retaining spring.

4. The pull-out locking device according to claim 1, wherein the movement of the respective bolt part from the passive position into the actuating position is accomplished by a sloping surface.

5. The pull-out locking device according to claim 1, wherein the locking surface is arranged on the respective pull-out rail or a part connected non-displaceably to this in relation to the pull-out direction at least over an initial section of the pull-out section comprising the remaining section.

6. The pull-out locking device according to claim 5, wherein the locking surface is arranged on the actuating part.

7. The pull-out locking device according to claim 1, wherein the actuating parts are mounted so as to be movable in each case on the base bodies between a base position and a waiting position and interact in each case with an entrainer device moving with the pull-out rail over the entire pull-out section, wherein the respective actuating part occupies the base position in the closed position of the pull-out rail in which the entrainer device is coupled to the actuating part and is moved into the waiting position when pulling out the pull-out rail by the entrainer device, in which position the entrainer device is decoupled from the actuating part, and in which the actuating part remains when the pull-out rail is pulled out further.

8. The pull-out locking device according to claim 1, wherein the remaining section is 1 mm to 10 mm.

9. The pull-out locking device according to claim 1, wherein a respective base body has cable guide portions for the cable element arranged above and below the position of the deflection of the cable element by the bolt part.

10. The pull-out locking device according to claim 1, wherein in the closed position of all the pull-out rails, the pull-out locking device can be moved from the release state into the locking state by a lock unit of a deflection of the cable element, a blocking of the displaceability of a movably mounted end of the cable element, or by a blocking of the displaceability of the push elements of the combination of push elements.

11. The pull-out locking device according to claim 1, wherein during the movement of the respective bolt part from the passive position into the actuating position a contact surface of the bolt part abutting against a cable element or the respective push rod moves in a direction lying at least substantially at right angles to the pull-out direction.

12. A pull-out locking device for drawers, comprising:

at least two pull-out guides which each comprise a body rail which can be attached to a common furniture body and a pull-out rail which can be attached to a respective one of the drawers, which can be pulled out in a pull-out direction over a pull-out section from a closed position into a pull-out position, bolt units assigned to the pull-out guides, which each comprise a base body attached to the body rail and a bolt part mounted so as to be movable on the base body between a passive position and an actuation position, wherein the bolt parts interact with a cable element of the pull-out locking device or with a respective push element of a combination of push elements of the pull-out locking device, wherein in a release state of the pull-out locking device when pulling out one of the pull-out rails, the bolt part of said pull-out rail is moved by an actuating part moved together with said pull-out rail at least over an initial part of the pull-out section from the passive position into the actuation position, whereby the cable element is deflected in the region of the bolt part by the bolt part or the push element, with which the bolt part interacts, is displaced by the bolt part and wherein in a locking state of the pull-out locking device and said pull-out rails located in the closed position, a movement of the bolt parts from the passive position in the direction of the actuation position is blocked by the cable element or by the push element interacting with the respective bolt part, wherein in the locking state of the pull-out locking device, a respective one of the pull-out rails located in the closed position can be pulled out over a remaining section that is less than ⅕ of the pull-out section, wherein due to the blocking of the movement of the bolt part from the passive position in the direction of the actuation position, a retaining spring arranged in a force transmission path between the bolt part and the base body, by which the bolt part is mounted, is deformed, in the locking state of the pull-out locking device, at least after pulling out one of the pull-out rails located in the closed position over the remaining section, a locking portion arranged on the bolt part or actuated by the bolt part is located in a locking position in which the locking portion blocks any further pull-out of said pull-out rail by abutting against a locking surface moving together with said pull-out rail, and in the release state of the pull-out locking device, when pulling out one of the pull-out rails starting from the closed position, the locking portion is located at least at the end of the remaining section in a released position in which the locking surface and the locking portion move past one another when the pull-out rail is pulled out further, and wherein a support surface for supporting the locking portion located in the locking position is arranged on the base body or on the body rail when a force is applied to the locking portion by the locking surface.

* * * * *